US011188757B2

(12) United States Patent
Vaquero et al.

(10) Patent No.: US 11,188,757 B2
(45) Date of Patent: Nov. 30, 2021

(54) METHOD AND APPARATUS FOR APPLYING VIDEO VIEWING BEHAVIOR

(71) Applicant: Nokia Technologies Oy, Espoo (FI)

(72) Inventors: Daniel Vaquero, Sunnyvale, CA (US); Muneem Shahriar, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/768,237

(22) PCT Filed: Dec. 7, 2018

(86) PCT No.: PCT/FI2018/050885
§ 371 (c)(1),
(2) Date: May 29, 2020

(87) PCT Pub. No.: WO2019/110874
PCT Pub. Date: Jun. 13, 2019

(65) Prior Publication Data
US 2020/0285857 A1    Sep. 10, 2020

(30) Foreign Application Priority Data

Dec. 8, 2017  (EP) .................................. 17206102

(51) Int. Cl.
*G06K 9/00*    (2006.01)
*G06F 3/01*    (2006.01)

(52) U.S. Cl.
CPC ..... *G06K 9/00718* (2013.01); *G06K 9/00744* (2013.01); *G06F 3/013* (2013.01)

(58) Field of Classification Search
None
See application file for complete search history.

(56) References Cited

U.S. PATENT DOCUMENTS 7,500,916 B2    3/2009  Lieberman et al.
7,881,493 B1    2/2011  Edwards et al.
(Continued)

FOREIGN PATENT DOCUMENTS

EP    2741293 A1    6/2014
EP    3058873 A1    8/2016
(Continued)

OTHER PUBLICATIONS

"New Publisher Tools for 360 Video", FB Media, Retrieved on Jan. 20, 2020, Webpage available at : https://www.facebook.com/facebookmedia/blog/new-publisher-tools-for-360-video.
(Continued)

*Primary Examiner* — Santiago Garcia
(74) *Attorney, Agent, or Firm* — Nokia Technologies Oy

(57) ABSTRACT

A method, apparatus and computer-readable storage medium provide information regarding changes in viewing behavior between first and second frame of a video. In a method, a plurality of objects that are included within a respective frame are identified. The method determines a first number of views of each of at least one of the plurality of objects in the first frame. For the second frame subsequent to the first frame, the method determines a second number of views of each of at least one of the plurality of objects that are in the second frame and identifies a number of instances in which a respective viewer who viewed one object within the first frame changed to view a different object within the second frame. The method additionally causes information to be provided regarding changes in viewing behavior between the first and second frame of the video.

20 Claims, 17 Drawing Sheets

(56) References Cited

U.S. PATENT DOCUMENTS

| | | | |
|---|---|---|---|
| 8,660,673 | B2 | 2/2014 | Short |
| 9,098,503 | B1 | 8/2015 | Johnson et al. |
| 9,131,204 | B2 | 9/2015 | Stankiewicz et al. |
| 9,619,529 | B2 | 4/2017 | Peacock et al. |
| 10,289,908 | B2 | 5/2019 | Chen et al. |
| 2004/0267816 | A1 | 12/2004 | Russek |
| 2008/0168384 | A1* | 7/2008 | Platzer ................. G06F 3/0485 715/784 |
| 2012/0017238 | A1* | 1/2012 | Miller ..................... G06T 7/194 725/32 |
| 2012/0026340 | A1* | 2/2012 | Mikhalkin ............. H04N 7/185 348/169 |
| 2012/0264511 | A1* | 10/2012 | Marsland .............. A63F 13/533 463/31 |
| 2014/0046973 | A1 | 2/2014 | Rinearson et al. |
| 2014/0063263 | A1* | 3/2014 | Bernal ............. G08B 13/19645 348/169 |
| 2014/0098996 | A1* | 4/2014 | Fujimatsu ............... G06T 7/254 382/103 |
| 2015/0064677 | A1 | 3/2015 | Baphna et al. |
| 2015/0363949 | A1* | 12/2015 | Manohar ............... H04L 41/145 345/441 |
| 2016/0187972 | A1* | 6/2016 | Biswas .................. G01C 21/36 345/156 |
| 2016/0191893 | A1 | 6/2016 | Gewickey et al. |
| 2016/0274705 | A1 | 9/2016 | Kapadia et al. |
| 2016/0300392 | A1 | 10/2016 | Jonczyk et al. |
| 2016/0301862 | A1 | 10/2016 | Rantakokko et al. |
| 2016/0371726 | A1* | 12/2016 | Yamaji ............... G06K 9/00369 |
| 2017/0024095 | A1* | 1/2017 | Glasgow ................. G06F 16/71 |
| 2017/0104927 | A1 | 4/2017 | Mugavero et al. |
| 2018/0210621 | A1* | 7/2018 | Lee ......................... G06F 3/017 |
| 2018/0373348 | A1* | 12/2018 | Price .................... G01B 11/026 |
| 2019/0057518 | A1* | 2/2019 | Liu ..................... G06K 9/00771 |
| 2019/0303669 | A1* | 10/2019 | Spooner ............... G06K 9/3241 |

FOREIGN PATENT DOCUMENTS

| | | |
|---|---|---|
| WO | 2011/042989 A1 | 4/2011 |
| WO | 2016/114918 A1 | 7/2016 |
| WO | 2016/115154 A1 | 7/2016 |

OTHER PUBLICATIONS

"VR Analytics—How to Use a Virtual Reality Heat Map", Insta VR, Retrieved on Jan. 20, 2020, Webpage available at : http://www.instavr.co/articles/general/vr-analytics-how-to-use-a-virtual-reality-heat-map.

"Reality as a Platform",Intelligence, Retrieved on Jan. 20, 2020, Webpage available at : https://medium.com/intelligence-magazine/reality-as-a-platform-db4310c49f88.

Bala et al., "IVRUX: A Tool for Analyzing Immersive Narratives in Virtual Reality", International Conference on Interactive Digital Storytelling, 2016, pp. 3-11.

Jain et al., "Gaze-driven Video Re-editing", ACM Transactions on Graphics, vol. 34, No. 2, Feb. 2015, 12 pages.

Christoforou et al., "From the Eyes and the Heart: a Novel Eye-gaze Metric That Predicts Video Preferences of a Large Audience", Frontiers in Psychology, vol. 6, May 2015, pp. 1-11.

Lindley et al., "Game Play Schemas: From Player Analysis to Adaptive Game Mechanics", International Journal of Computer Games Technology, vol. 2008, 2008, 8 pages.

Rother et al., "GrabCut": Interactive Foreground Extraction Using Iterated Graph Cuts, ACM Transactions on Graphics (TOG), vol. 23, No. 3, Aug. 2004, pp. 309-314.

Yilmaz et al., "Object Tracking: A Survey", ACM Computing Surveys (CSUR), vol. 38, No. 4, Dec. 2006, pp. 1-45.

Kalal et al., "Tracking-Learning-Detection", IEEE Transactions on Pattern Analysis and Machine Intelligence,vol. 34, No. 7, Jul. 2012, pp. 1409-1422.

Extended European Search Report received for corresponding European Patent Application No. 17206102.0, dated Jul. 5, 2018, 9 pages.

Lu et al., "Story-Driven Summarization for Egocentric Video", IEEE Conference on Computer Vision and Pattern Recognition, Jun. 23-28, 2013, pp. 2714-2721.

Lee et al., "Discovering Important People and Objects for Egocentric Video Summarization", IEEE Conference on Computer Vision and Pattern Recognition, Jun. 16-21, 2012, pp. 1346-1353.

Held et al., "Learning to Track at 100 FPS with Deep Regression Networks", Computer Vision and Pattern Recognition, arXiv, Apr. 6, 2016, pp. 1-25.

Held et al., "Learning to Track at 100 FPS with Deep Regression Networks", European Conference on Computer Vision, 2016, pp. 749-765.

Extended European Search Report received for corresponding European Patent Application No. 17206111.1, dated Jul. 5, 2018, 10 pages.

International Search Report and Written Opinion received for corresponding Patent Cooperation Treaty Application No. PCT/FI2018/050885, dated Mar. 18, 2019, 15 pages.

International Search Report and Written Opinion received for corresponding Patent Cooperation Treaty Application No. PCT/FI2018/050884, dated Mar. 18, 2019, 15 pages.

Office action received for corresponding European Patent Application No. 17206111.1, dated Sep. 27, 2021, 6 pages.

Office action received for corresponding European Patent Application No. 17206102.0, dated Oct. 6, 2021, 5 pages.

* cited by examiner

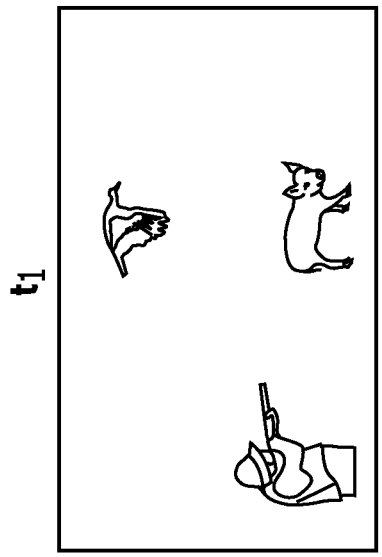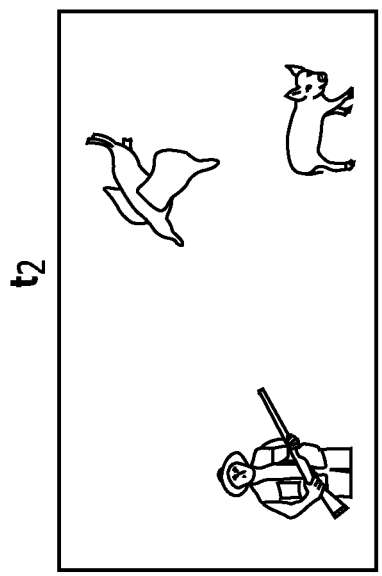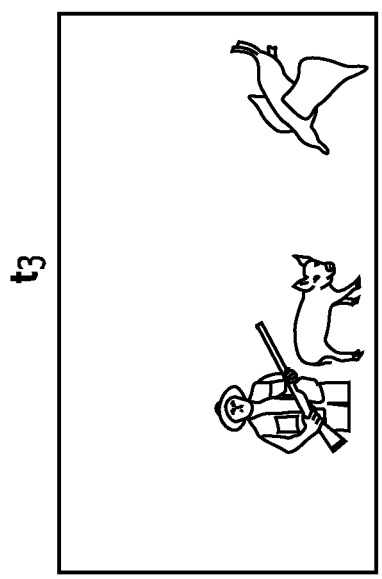
Figure 15
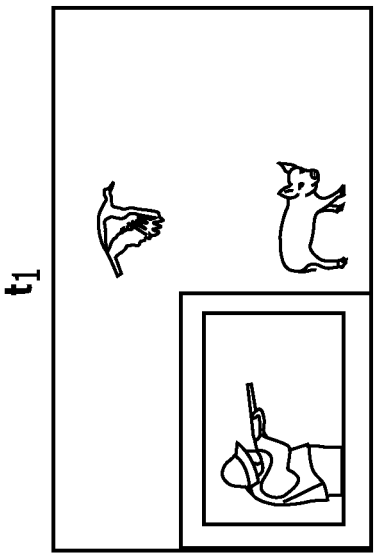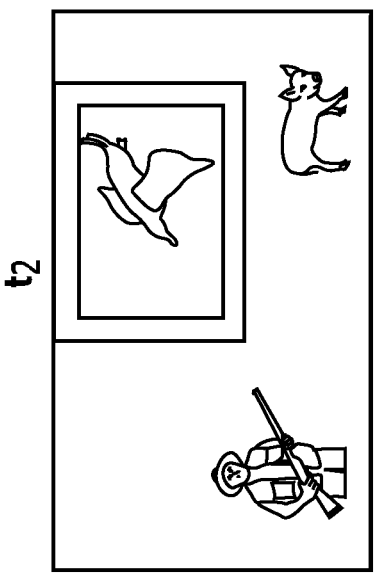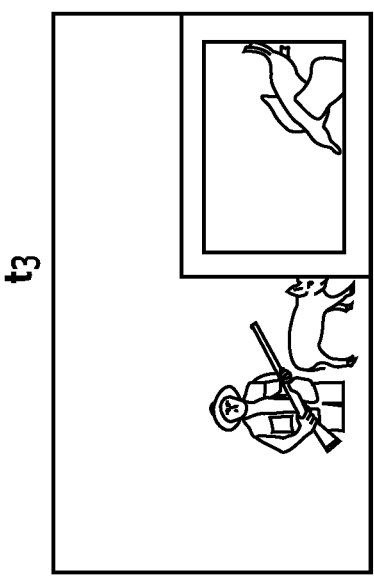
Figure 16

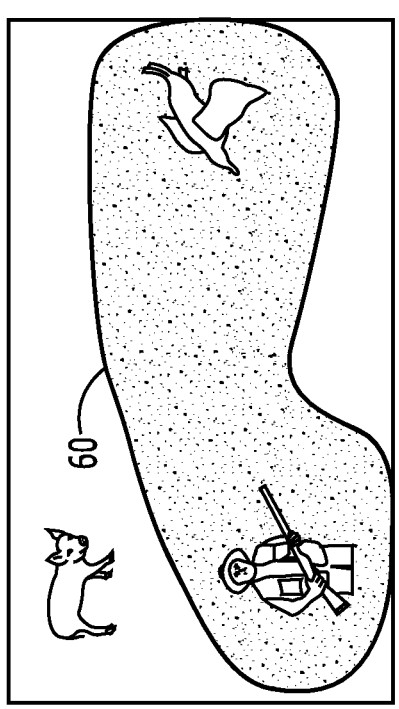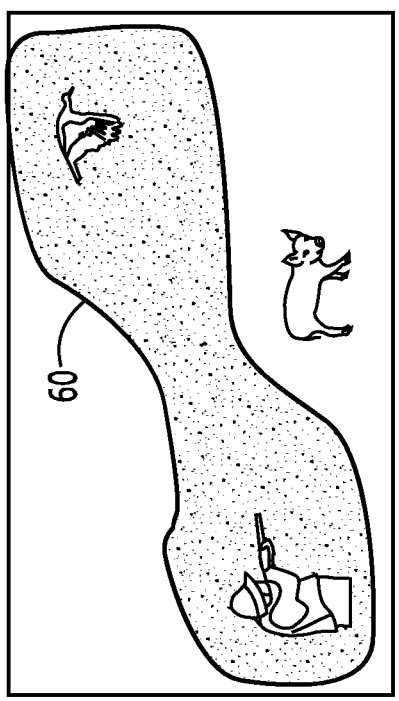
Figure 18

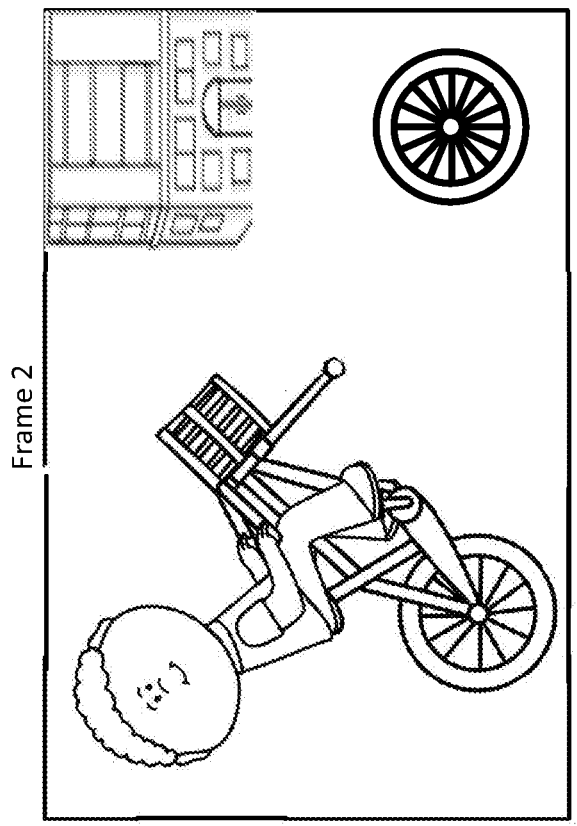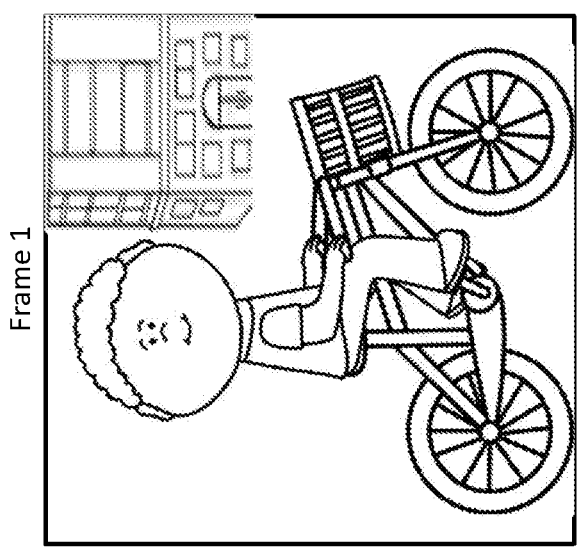
Figure 19

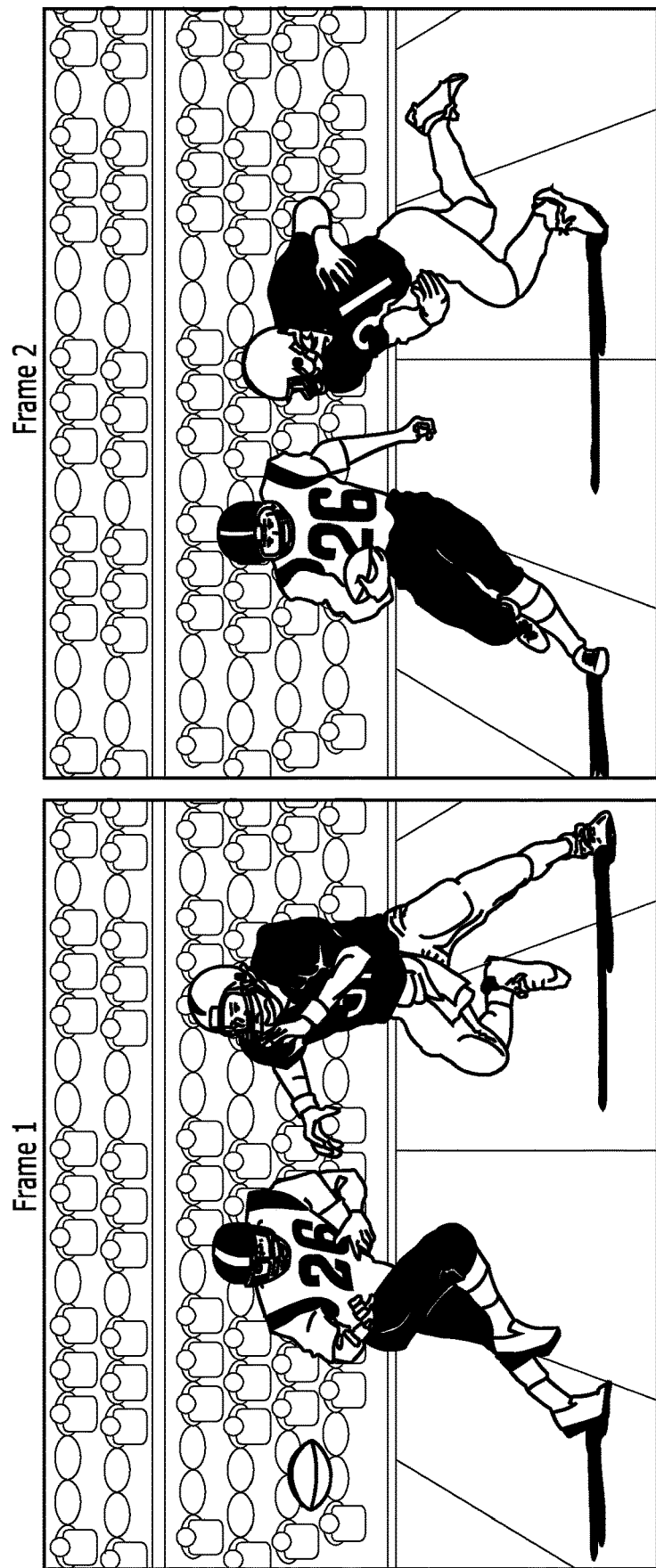

METHOD AND APPARATUS FOR APPLYING VIDEO VIEWING BEHAVIOR

RELATED APPLICATION

This application claims priority to PCT Application No. PCT/FI2018/050885, filed on Dec. 7, 2018, which claims priority to European Patent Application No. 17206102.0, filed on Dec. 8, 2017, each of which is incorporated herein by reference in its entirety.

TECHNICAL FIELD

An example embodiment relates generally to a method, apparatus and computer-readable storage medium relating to videos and, more particularly, to a method, apparatus and computer-readable storage medium for applying video viewing behavior.

BACKGROUND

Videos are comprised of a plurality of sequential frames that may present, for example, a series of two dimensional (2D) or three dimensional (3D) images. Some videos provide immersive content including, for example, 360° immersive multimedia images. Such immersive content may be consumed for a variety of applications including, for example, virtual reality systems. The immersive multimedia content provided by such 360° images generally limits the viewer so as to see only a constrained subset or portion of the full 360° field of view.

A viewer can pan through a scene, such as by moving their head in an instance in which the viewer is utilizing a head mounted display or by scrolling through the scene utilizing other input devices, such as a mouse, a keyboard or a touchscreen. Even if a viewer expends the effort necessary to pan through the scene, a 360° video has a very large field of view so a viewer may find it difficult to decide where to focus within the different frames of the video. As such, a viewer may not focus, at least not consistently, upon important aspects of the video, such as those regions of the video or objects shown in the video that the creator of the content preferred for the viewer to consume.

BRIEF SUMMARY

A method, apparatus and computer program product are provided in accordance with an example embodiment in order to provide information regarding changes in viewing behavior between first and second frames of a video in relation to a plurality of objects included within the frames of the video. Based upon the information regarding changes in viewing behavior between frames of a video, one or more actions may be performed on a more informed basis. For example, the method, apparatus and computer program product of an example embodiment may define a storyline based at least partially upon the changes in viewing behavior between frames of a video. Additionally or alternatively, the method, apparatus and computer program product of an example embodiment may modify the image quality of one or more frames of the video based upon the changes in viewing behavior between the frames of the video. By taking action based upon the information regarding changes in viewing behavior between the frames of the video in relation to a plurality of objects included within the frames of the video, the resulting user experience may be enhanced in an efficient manner.

In an example embodiment, a method is provided that includes identifying, for a plurality of identified frames of a video comprising a first frame and at least one second frame subsequent to the first frame, a plurality of objects that are included within the first frame and a plurality of objects that are included in the second frame. The method also determines a first number of views by a plurality of viewers of each of at least one of the plurality of objects that are included within the first frame. For the second frame, the method determines a second number of views by the plurality of viewers of each of at least one of the plurality of objects that are included within the second frame and identifies a number of instances in which a respective viewer who viewed one of the plurality of objects within the first frame changed to view a different one of the plurality of objects within the second frame. The method additionally includes causing information to be provided regarding changes in viewing behavior between the first and second frames of the video in relation to the plurality of objects included therein.

The method of an example embodiment also includes defining a storyline based at least partially upon the changes in viewing behavior between the first and second frames of the video. In this example embodiment, the method may define that storyline to focus upon a first object in the first frame and a second object in the second frame based at least partially upon the changes in viewing behavior from the first object in the first frame to the second object in the second frame. Additionally or alternatively, the method of an example embodiment also includes modifying image quality of at least the second frame based at least partially upon the changes in viewing behavior between the first and second frames of the video. In this example embodiment, the method may modify the image quality of first and second objects based at least partially upon the changes in viewing behavior from the first object in the first frame to the second object in the second frame. In relation to identifying the plurality of objects, the method of an example embodiment may identify more objects in the second frame than in the first frame, such as in an instance in which one object in the first frame splits into a plurality of objects in the second frame. Alternatively, the method of an example embodiment may identify the plurality of objects by identifying fewer objects in the second frame than in the first frame, such as in an instance in which a plurality of objects in the first frame merge into a single object in the second frame.

In another example embodiment, an apparatus is provided that includes means for identifying, for a plurality of identified frames of a video comprising a first frame and at least one second frame subsequent to the first frame, a plurality of objects that are included within the first frame and a plurality of objects included in the second frame. The apparatus also includes means for determining a first number of views by a plurality of viewers of each of at least one of the plurality of objects that are included within the first frame. For the at least one second frame, the apparatus includes means for determining a second number of views by the plurality of viewers of each of at least one of the plurality of objects that are included within the second frame and means for identifying a number of instances in which a respective viewer who viewed one of the plurality of objects within the first frame changed to view a different one of the plurality of objects within the second frame. The apparatus additionally includes means for causing information to be provided regarding changes in viewing behavior between the first and second frames of the video in relation to the plurality of objects included therein.

The apparatus of an example embodiment also includes means for defining a storyline based at least partially upon the changes in viewing behavior between the first and second frames of the video. In this example embodiment, the storyline may be defined to focus upon a first object in the first frame and a second object in the second frame based at least partially upon the changes in viewing behavior from the first object in the first frame to the second object in the second frame. Additionally or alternatively, the apparatus of an example embodiment also includes means for modifying image quality of at least the second frame based at least partially upon the changes in viewing behavior between the first and second frames of the video. In this example embodiment, the image quality of first and second objects may be modified based at least partially upon the changes in viewing behavior from the first object in the first frame to the second object in the second frame. In relation to identifying the plurality of objects, more objects may be identified in the second frame than in the first frame, such as in an instance in which one object in the first frame splits into a plurality of objects in the second frame. Alternatively, fewer objects may be identified in the second frame than in the first frame, such as in an instance in which a plurality of objects in the first frame merge into a single object in the second frame.

In a further example embodiment, an apparatus is provided that includes at least one processor and at least one memory including computer program code with the at least one memory and the computer program code configured to, with the processor, cause the apparatus, to identify, for a plurality of identified frames of a video comprising a first frame and at least one second frame subsequent to the first frame, a plurality of objects that are included within the first frame and a plurality of objects that are included in the second frame. The at least one memory and the computer program code are also configured to, with the processor, cause the apparatus, to determine a first number of views by a plurality of viewers of each of at least one of the plurality of objects that are included within a first frame. For the at least one second frame, the at least one memory and the computer program code are further configured to, with the processor, cause the apparatus, to determine a second number of views by the plurality of viewers of each of at least one of the plurality of objects that are included within the second frame and identifies a number of instances in which a respective viewer who viewed one of the plurality of objects within the first frame changed to view a different one of the plurality of objects within the second frame. The at least one memory and the computer program code are further configured to, with the processor, cause the apparatus, to cause information to be provided regarding changes in viewing behavior between the first and second frames of the video in relation to the plurality of objects included therein.

The at least one memory and the computer program code are further configured to, with the processor, cause the apparatus of an example embodiment to define a storyline based at least partially upon the changes in viewing behavior between the first and second frames of the video. In this example embodiment, the storyline may be defined to focus upon a first object in the first frame and a second object in the second frame based at least partially upon the changes in viewing behavior from the first object in the first frame to the second object in the second frame. Additionally or alternatively, the at least one memory and the computer program code are further configured to, with the processor, cause the apparatus of an example embodiment to modify image quality of at least the second frame based at least partially upon the changes in viewing behavior between the first and second frames of the video. In this example embodiment, the image quality of first and second objects may be modified based at least partially upon the changes in viewing behavior from the first object in the first frame to the second object in the second frame. In relation to identifying the plurality of objects, more objects may be identified in the second frame than in the first frame, such as in an instance in which one object in the first frame splits into a plurality of objects in the second frame. Alternatively, fewer objects may be identified in the second frame than in the first frame, such as in an instance in which a plurality of objects in the first frame merge into a single object in the second frame.

In yet another example embodiment, a computer program product is provided that includes at least one non-transitory computer-readable storage medium having computer-readable program code stored therein with the computer-readable program code configured, upon execution, to identify, for a plurality of identified frames of a video comprising a first frame and at least one second frame subsequent to the first frame, a plurality of objects that are included within the first frame and a plurality of objects included in the second frame. The computer-readable program code is also configured to determine a first number of views by a plurality of viewers of each of at least one of the plurality of objects that are included within the first frame. For the at least one second frame, the computer-readable program code is further configured to determine a second number of views by the plurality of viewers of each of at least one of the plurality of objects that are included within the second frame and to identify a number of instances in which a respective viewer who viewed one of the plurality of objects within the first frame changed to view a different one of the plurality of objects within the second frame. The computer-readable program code is additionally configured to cause information to be provided regarding changes in viewing behavior between the first and second frames of the video in relation to the plurality of objects included therein.

The computer-readable program code of an example embodiment is also configured to define a storyline based at least partially upon the changes in viewing behavior between the first and second frames of the video. In this example embodiment, the storyline may be defined to focus upon a first object in the first frame and a second object in the second frame based at least partially upon the changes in viewing behavior from the first object in the first frame to the second object in the second frame. Additionally or alternatively, the computer-readable program code of an example embodiment is also configured to modify image quality of at least the second frame based at least partially upon the changes in viewing behavior between the first and second frames of the video. In this example embodiment, the image quality of first and second objects may be modified based at least partially upon the changes in viewing behavior from the first object in the first frame to the second object in the second frame. In relation to identifying the plurality of objects, more objects may be identified in the second frame than in the first frame, such as in an instance in which one object in the first frame splits into a plurality of objects in the second frame. Alternatively, fewer objects may be identified in the second frame than in the first frame, such as in an instance in which a plurality of objects in the first frame merge into a single object in the second frame.

BRIEF DESCRIPTION OF THE DRAWINGS

Figure 1:
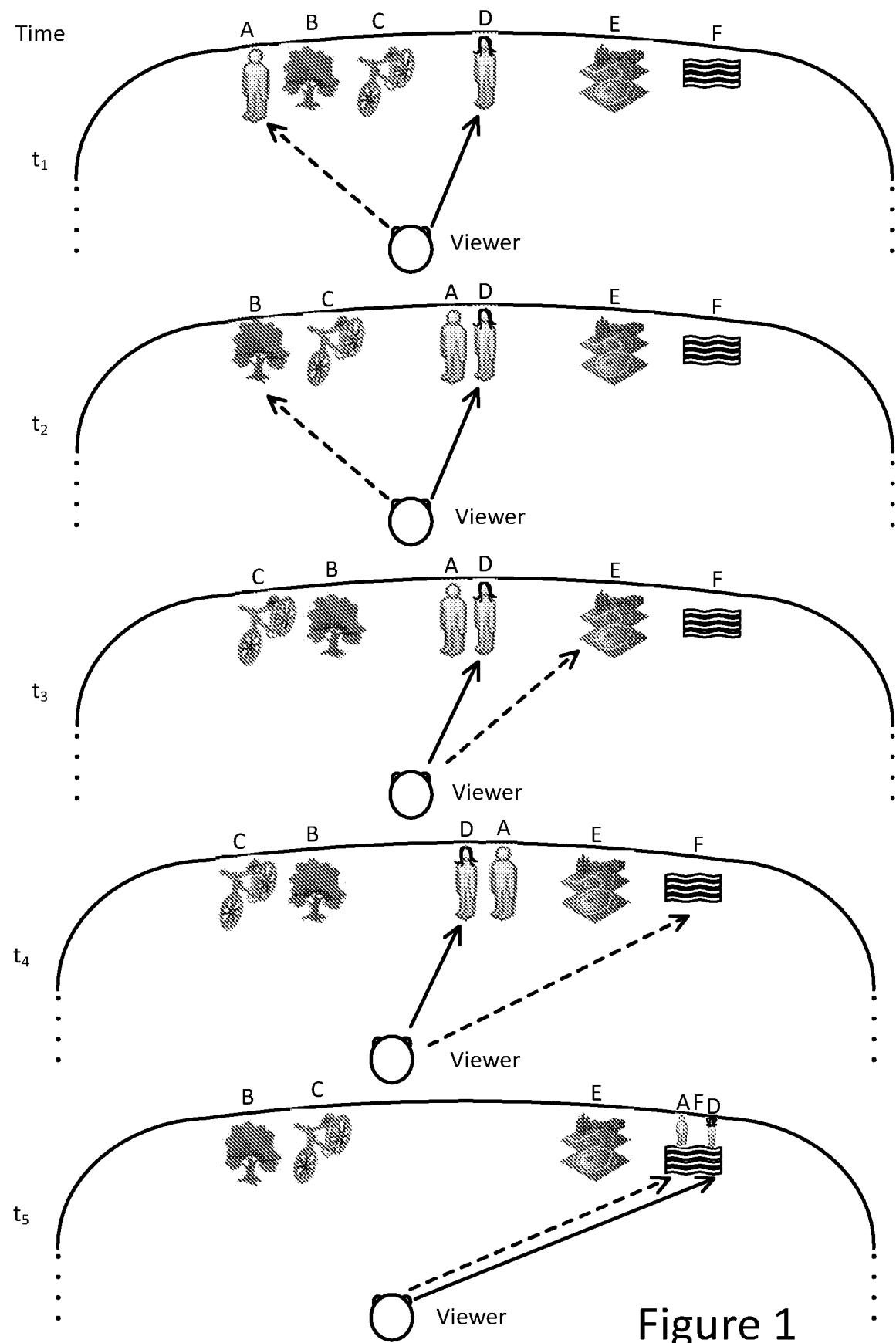
Figure 2:
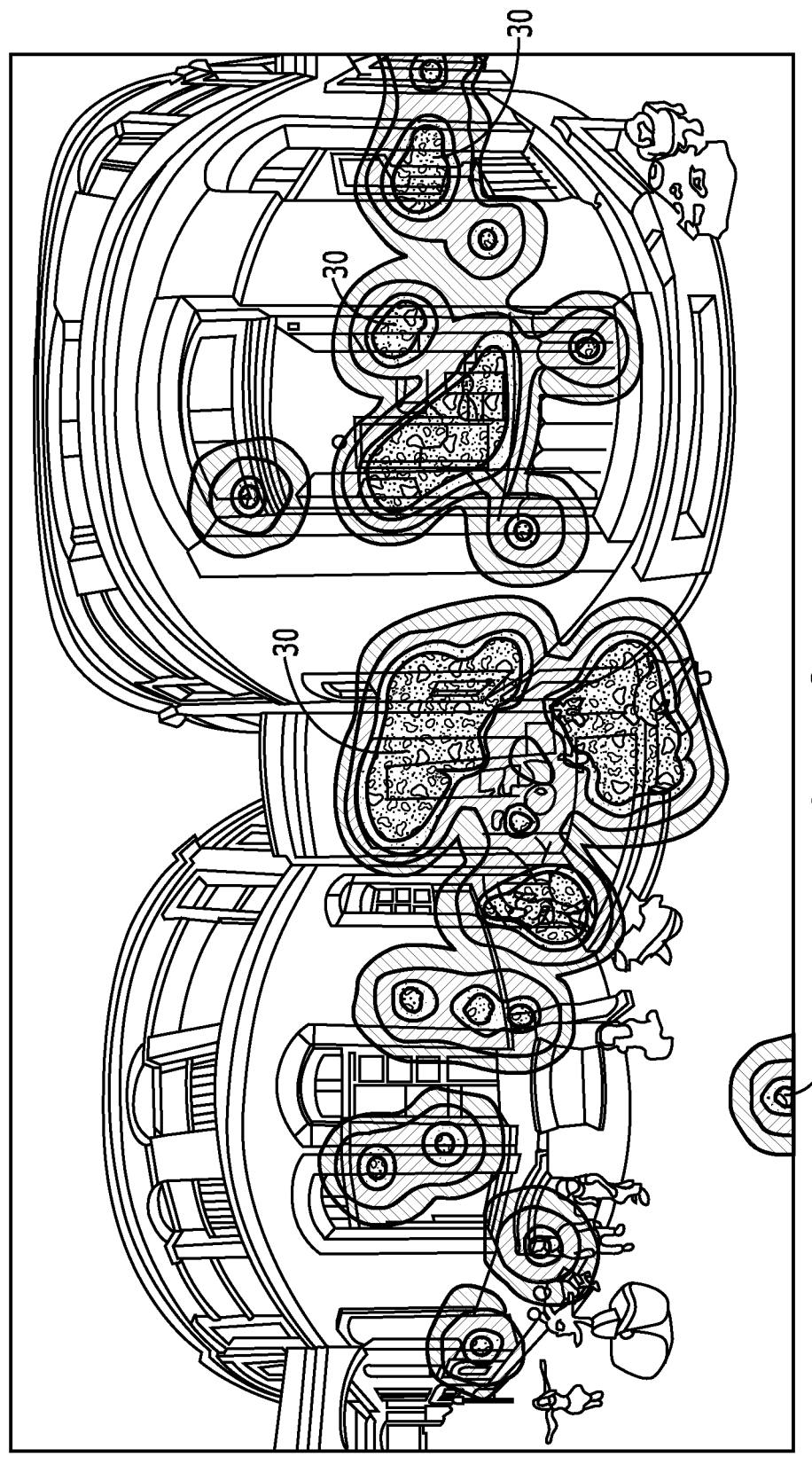
Figure 3:
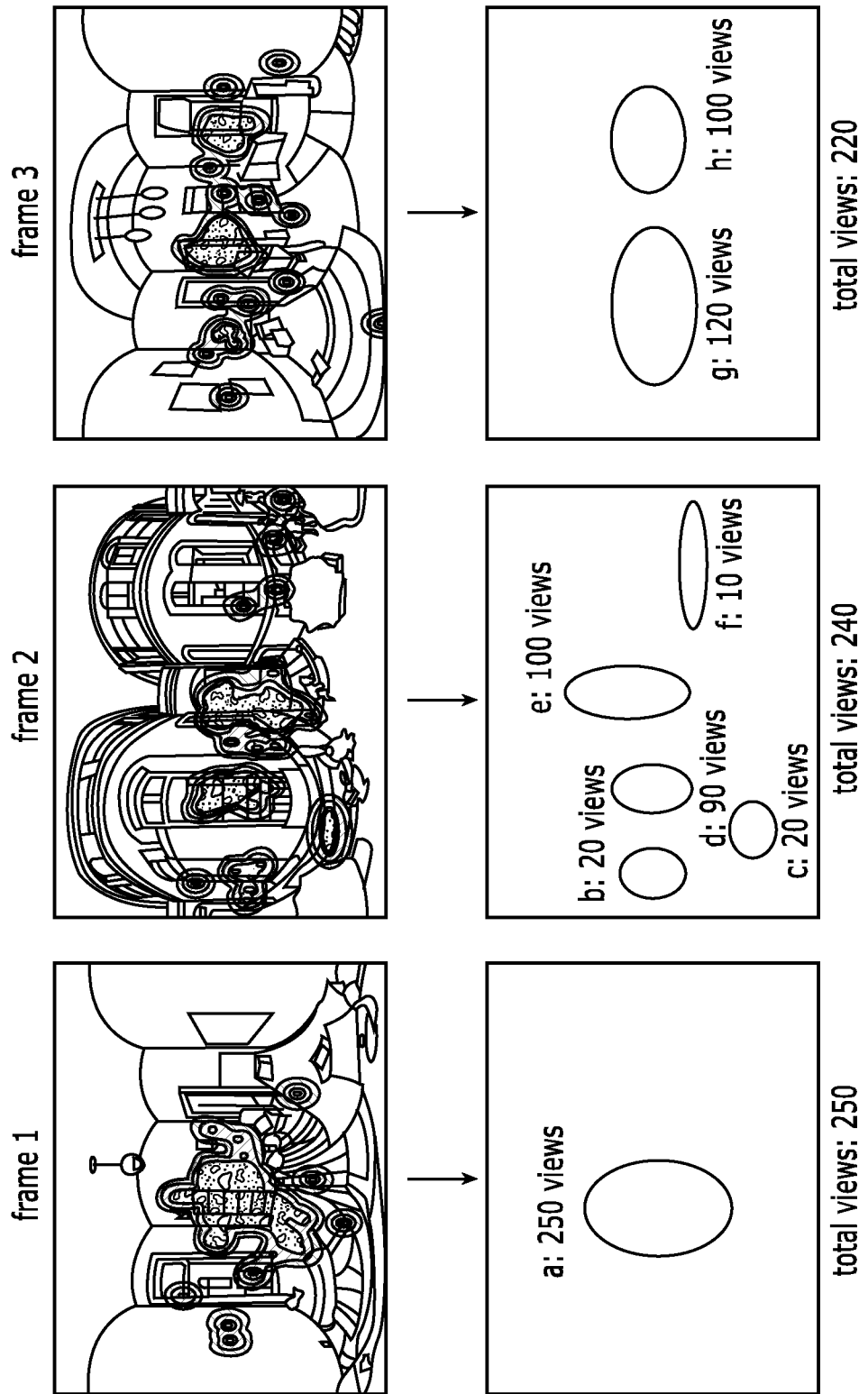
Figure 4:
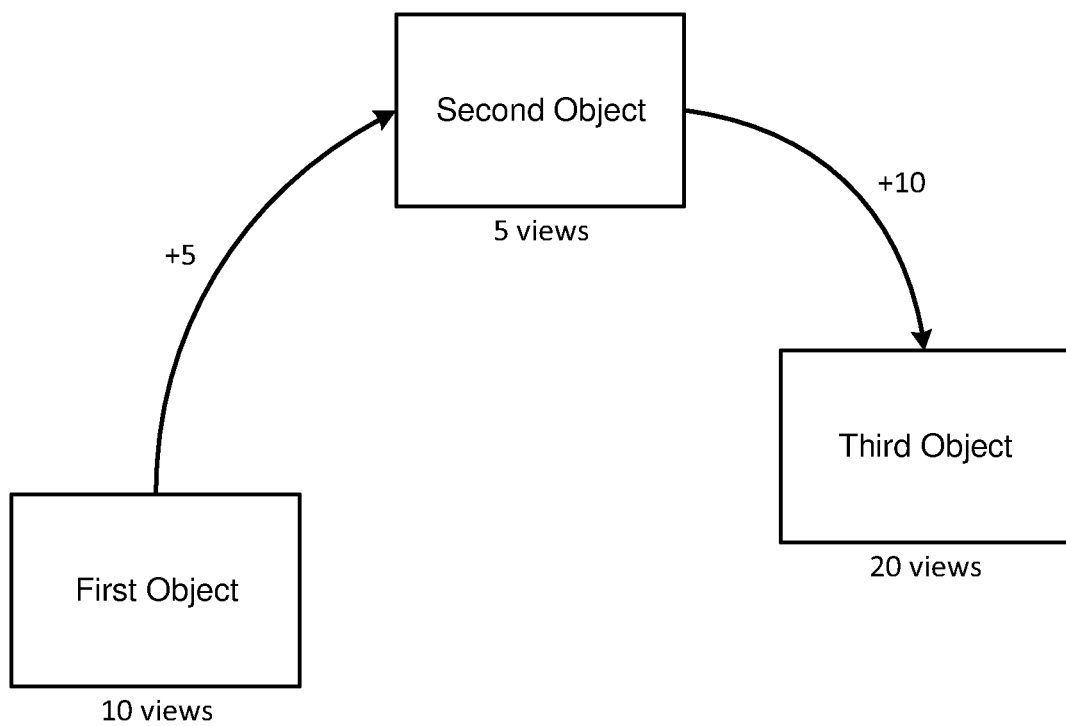
Figure 5:
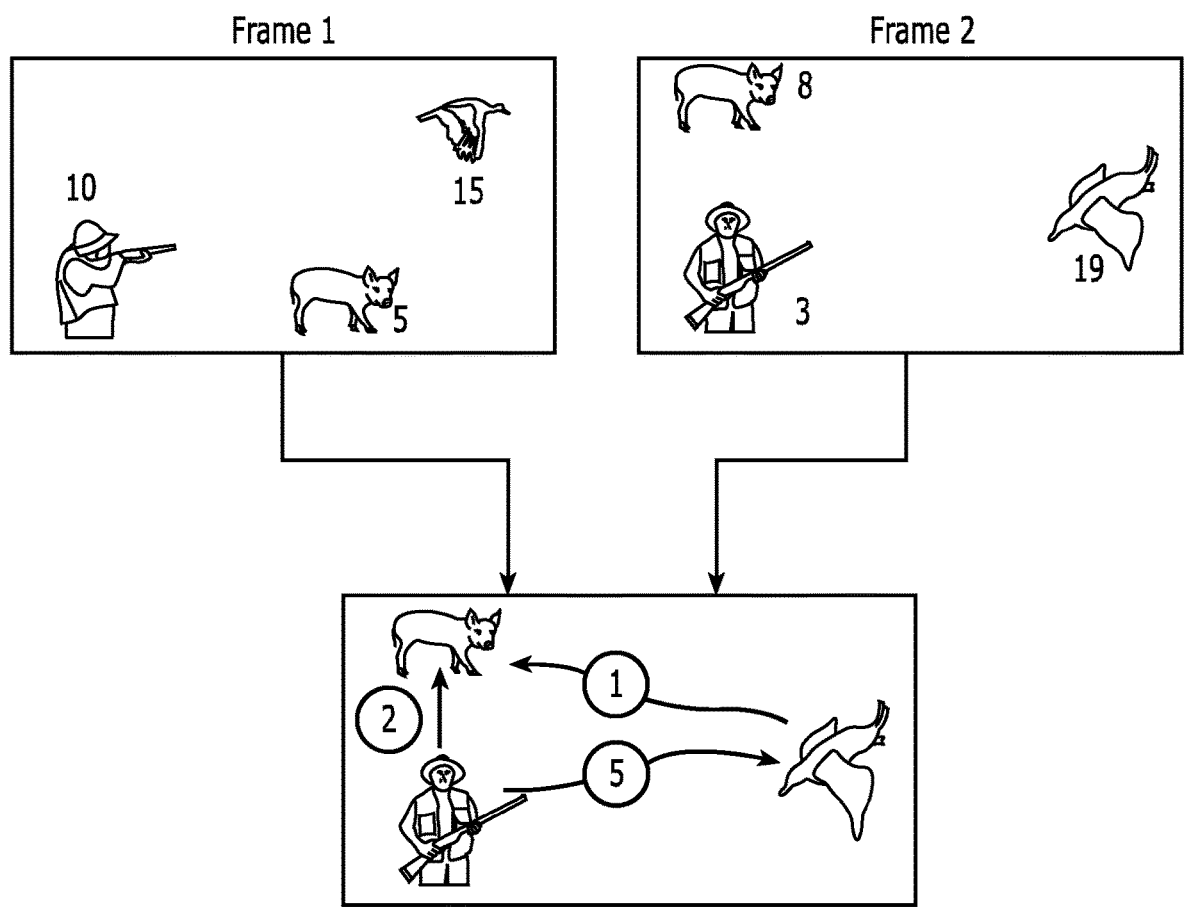
Figure 6:
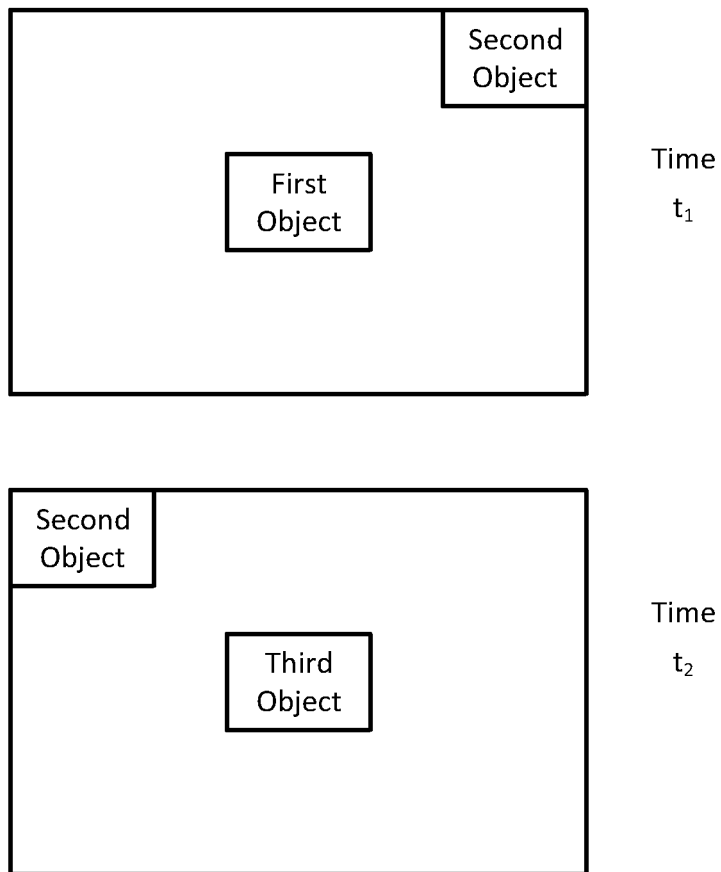
Figure 7:
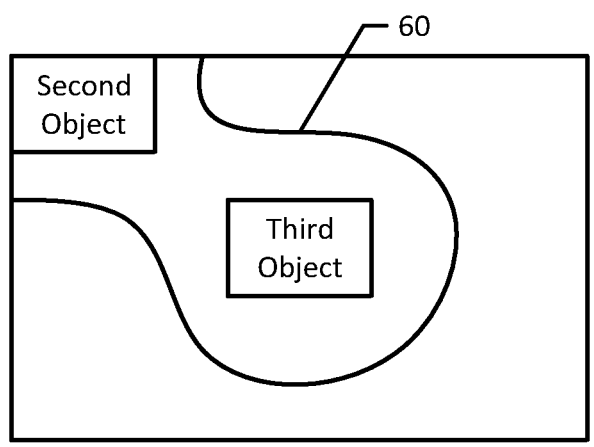

Having thus described certain example embodiments of the present disclosure in general terms, reference will here- inafter be made to the accompanying drawings, which are not necessarily drawn to scale, and wherein:

FIG. 1 illustrates, as examples, two different viewing behaviors as represented by the solid directional arrow and the dashed directional arrow for the frames of a video presented at times $t_1$, $t_2$, $t_3$, $t_4$ and $t_5$;

FIG. 2 is an example of a heat map generated for an example frame of a video;

FIG. 3 depicts heat maps for three frames of a video and example viewership for some of the regions within the frames in accordance with an example embodiment of the present disclosure;

FIG. 4 is a graphical representation of the change in the number of views of different objects from one frame to a subsequent frame of a video in accordance with an example embodiment of the present disclosure;

FIG. 5 is another graphical representation of the change in the number of views of different objects from one frame to a subsequent frame of a video in accordance with an example embodiment of the present disclosure;

FIG. 6 illustrates a storyline created in accordance with an example embodiment of the present disclosure in which the storyline is created based upon a change in viewing behavior from the frame displayed at time $t_1$ to the frame displayed at time $t_2$ in which the first object had the most views in the frame displayed at time $t_1$ and the largest change in views transitioned to the third object in the frame displayed at time $t_2$;

FIG. 7 illustrates an image in which the image quality of that portion of the image that includes the first and second objects is modified relative to the remainder of the image based upon a change in the viewing behavior from the frame displayed at time $t_1$ to the frame displayed at time $t_2$ in accordance with an example embodiment of the present disclosure.

Figure 8:
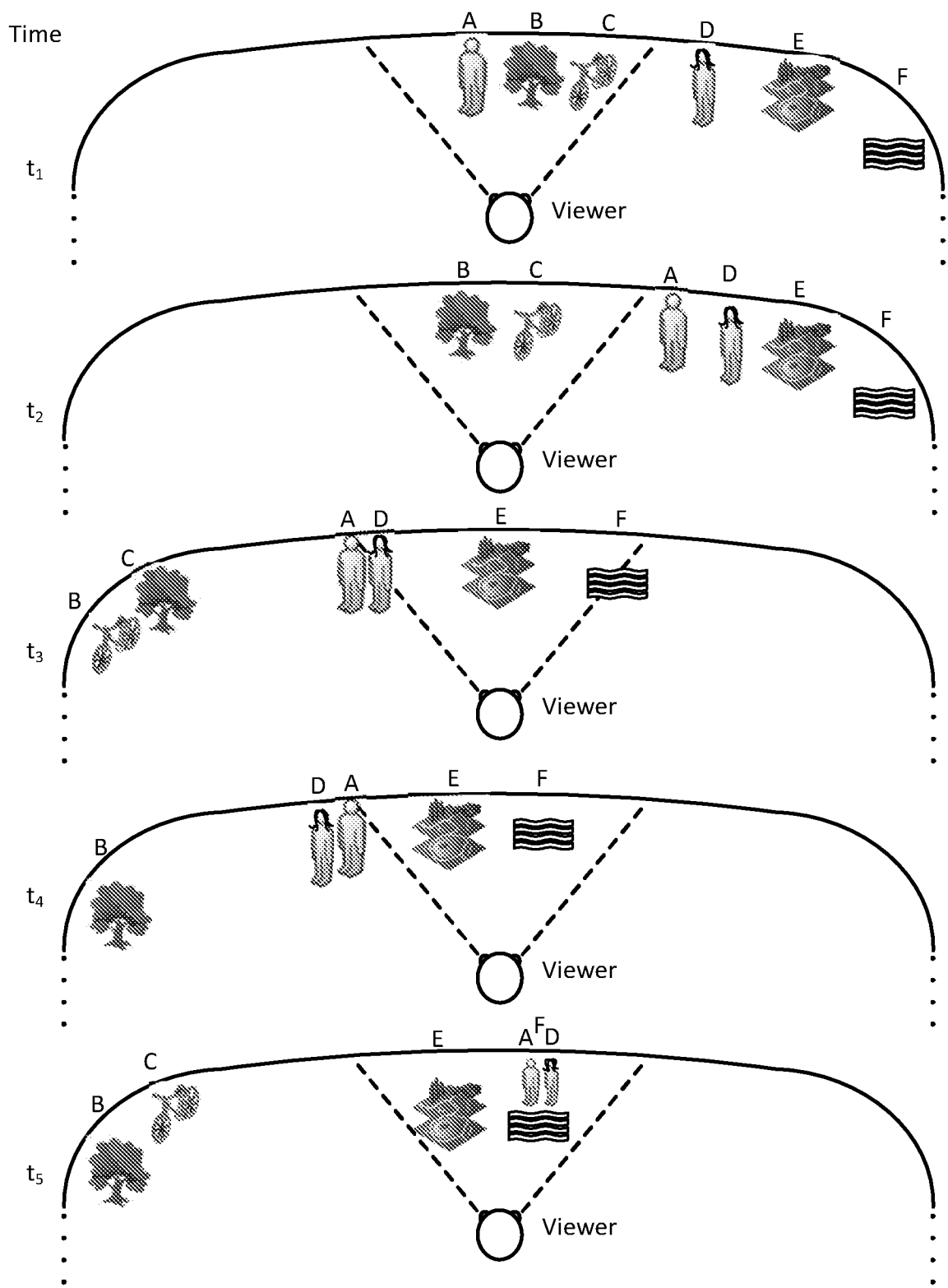
Figure 9:
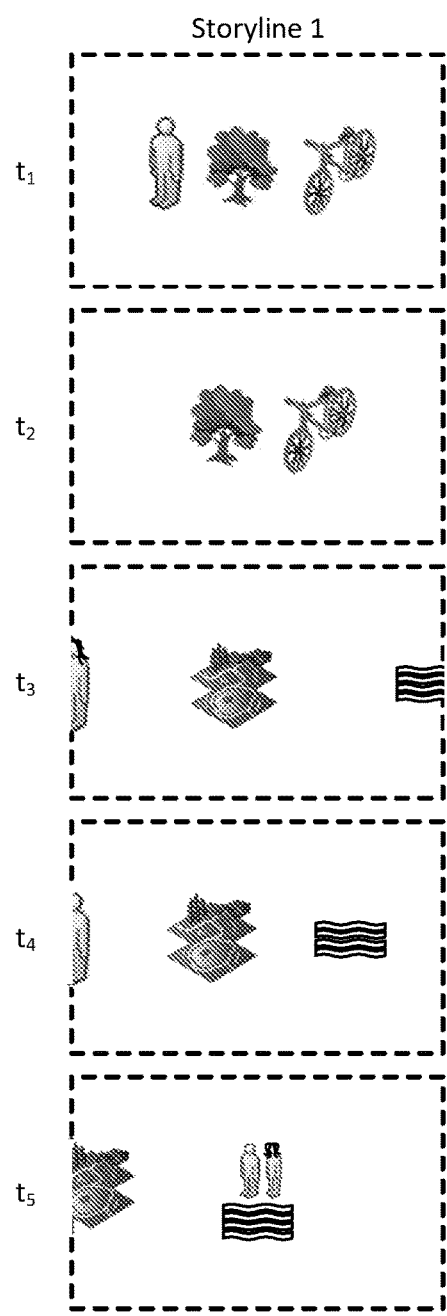
Figure 10:
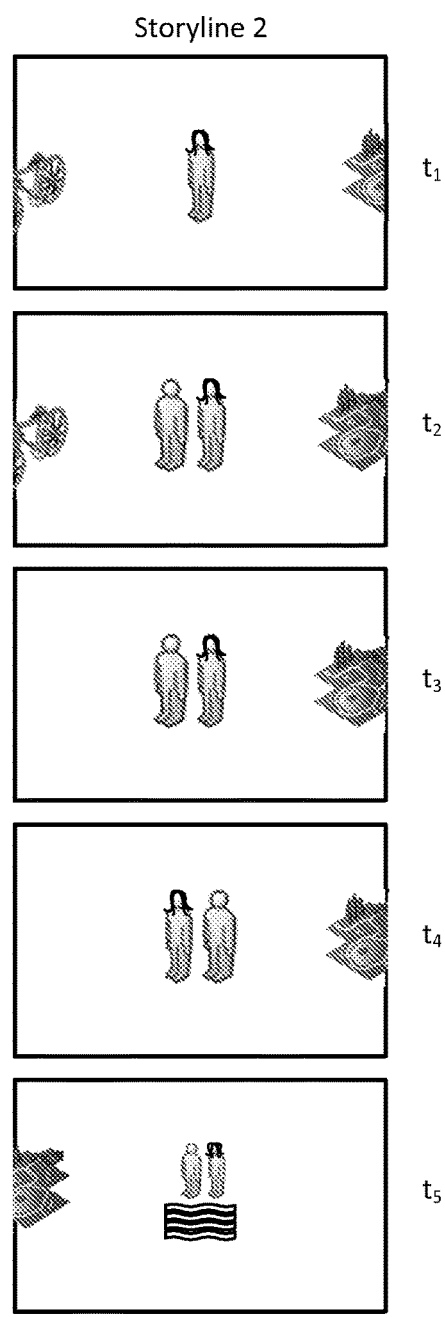
Figure 11:
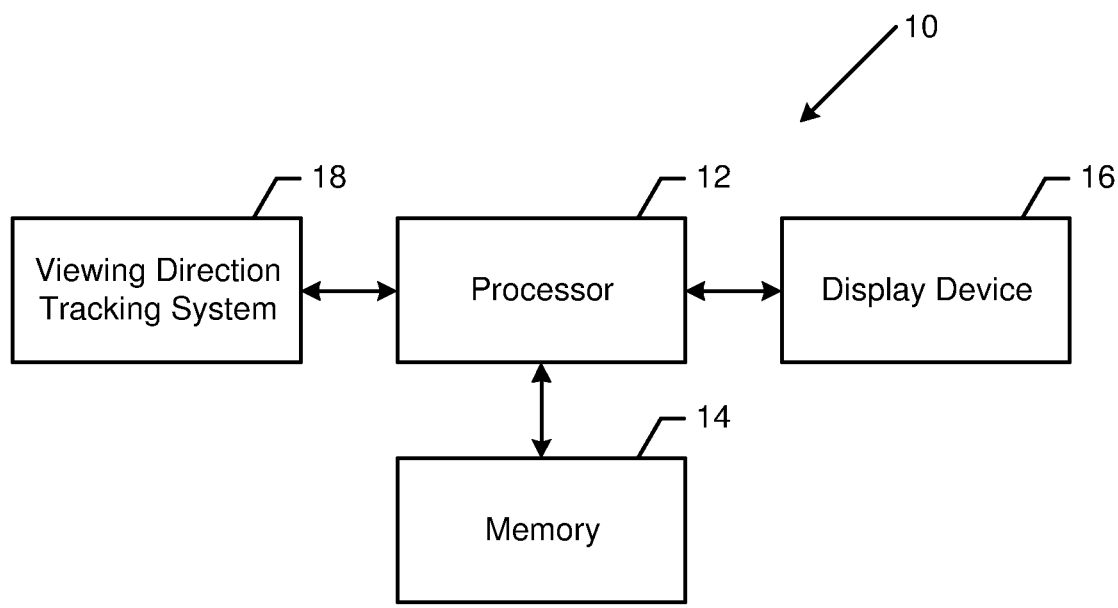
Figure 12:
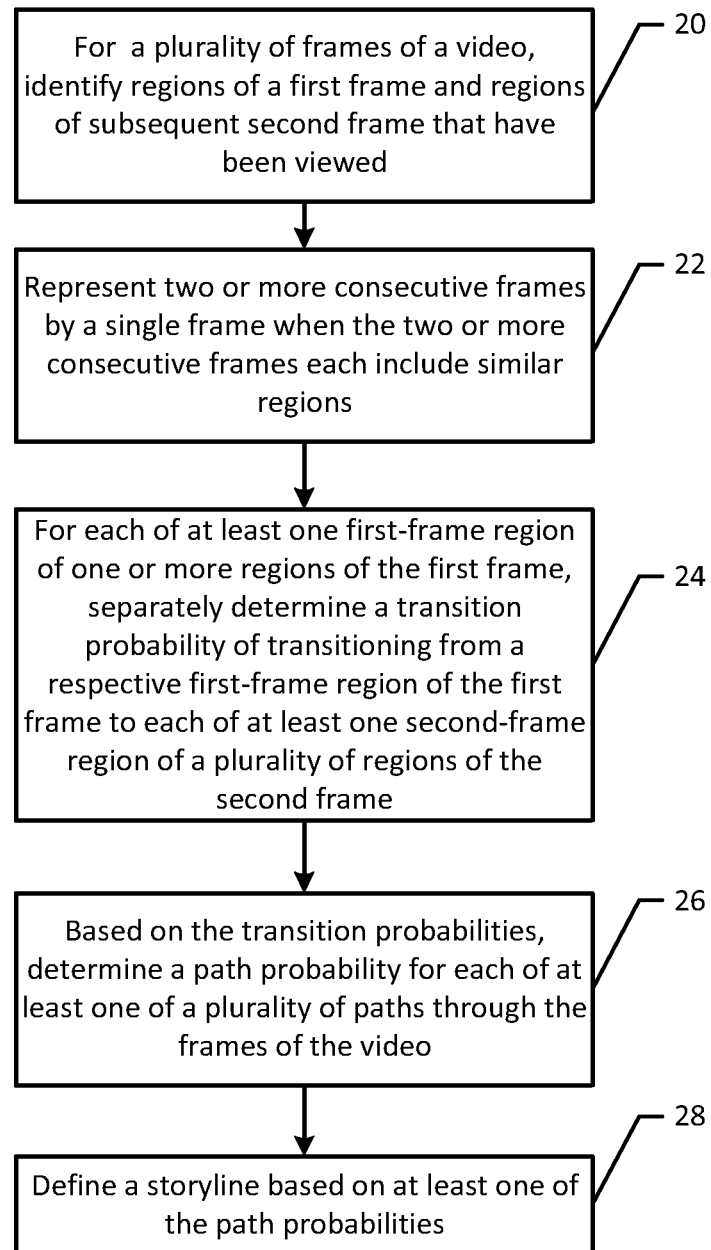
Figure 13:
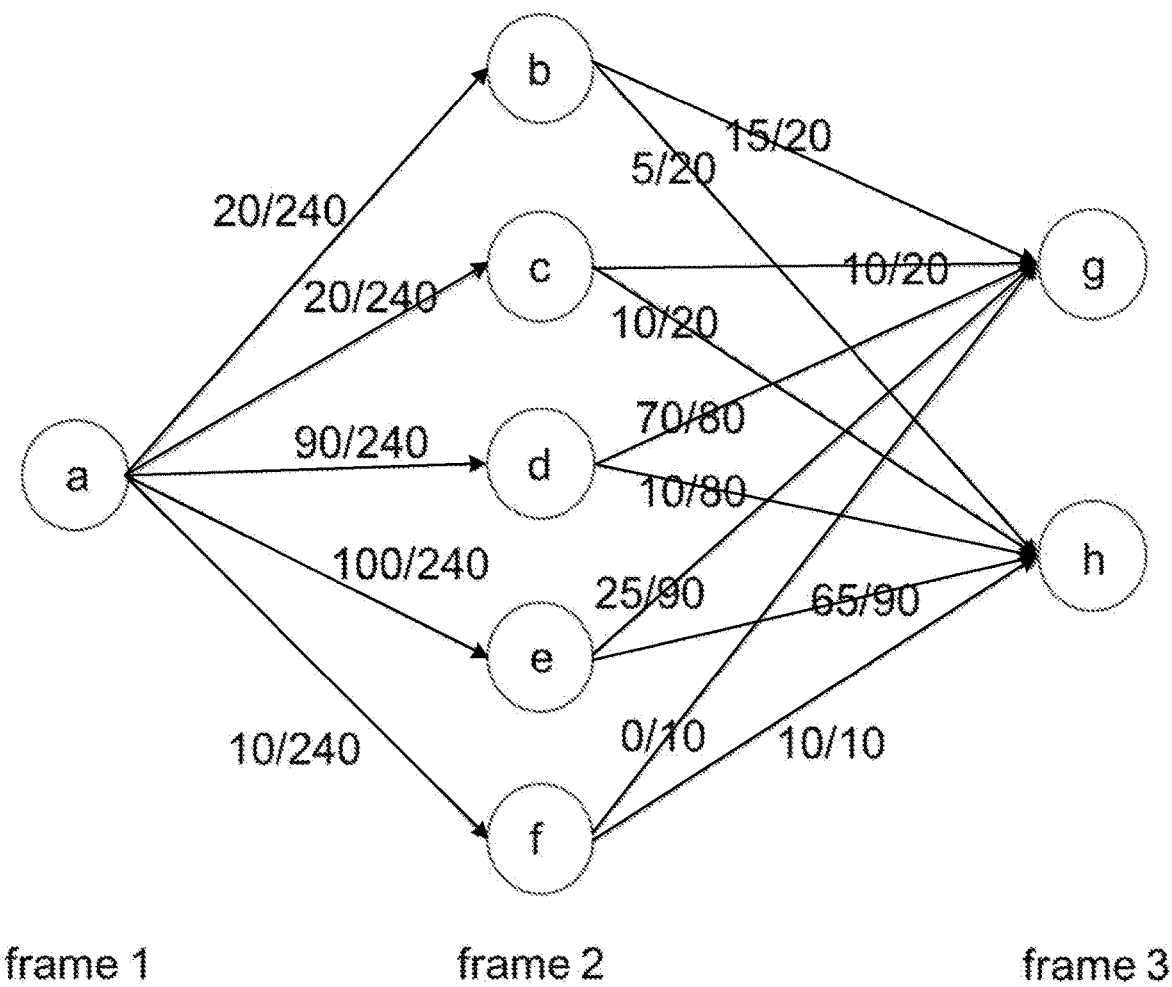
Figure 14:
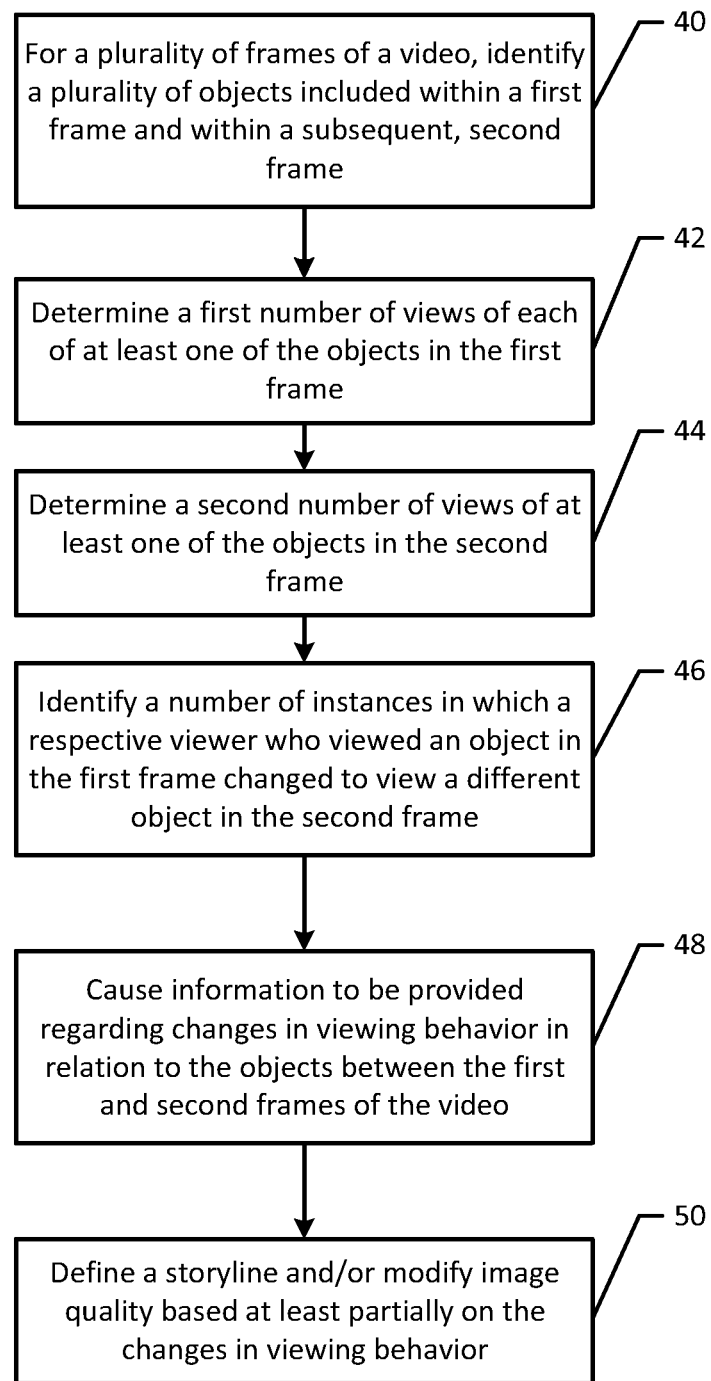
Figure 17:
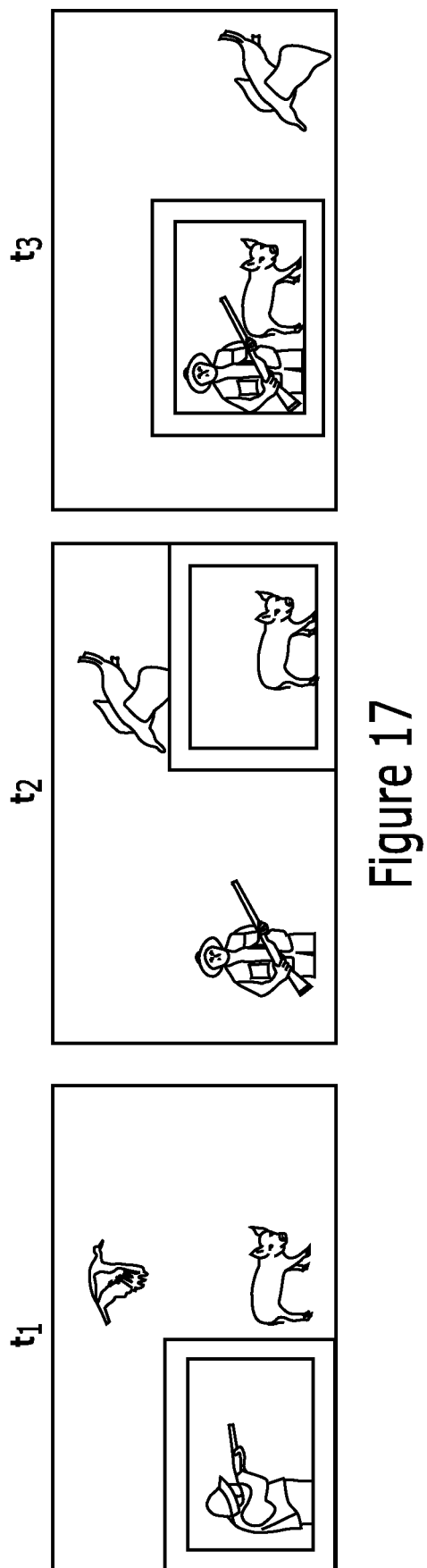

FIG. 8 illustrates the manner in which the various frames of the video are repositioned for a future viewer in accordance with an example embodiment of the present disclosure so as to center the object(s) upon which a prior viewer of the video had focused as represented by the dashed directional arrow in FIG. 1;

FIG. 9 illustrates a storyline as defined by the viewing behavior of a prior viewer as represented by the dashed directional arrow in FIG. 1 and following repositioning of the frames of the video as shown in FIG. 8 in accordance with an example embodiment of the present disclosure with the storyline including, for each frame of the video, the region upon which the prior viewer of the video had focused;

FIG. 10 illustrates another storyline as defined by the viewing behavior of a prior viewer as represented by the solid directional arrow in FIG. 1 in accordance with an example embodiment of the present disclosure with the storyline including, for each frame of the video, the region upon which the prior viewer of the video had focused;

FIG. 11 is a block diagram of an apparatus that may be specifically configured in accordance with an example embodiment of the present disclosure;

FIG. 12 is a flowchart illustrating operations performed, such as by the apparatus of FIG. 11, in accordance with an example embodiment of the present disclosure;

FIG. 13 is a graphical representation of a storyline graph that includes a plurality of paths through the frames of FIG. 3 with transition probabilities associated with respective edges of the graph in accordance with an example embodiment of the present disclosure;

FIG. 14 is a flowchart illustrating operations performed, such as by the apparatus of FIG. 1, in accordance with another example embodiment of the present disclosure;

FIG. 15 illustrates three frames of a video captured at times $t_1$, $t_2$ and $t_3$;

FIG. 16 illustrates a storyline created from the frames of the video of FIG. 15 in accordance with an example embodiment of the present disclosure;

FIG. 17 illustrates another storyline created from the frames of the video of FIG. 15 in accordance with an example embodiment of the present disclosure;

FIG. 18 illustrates the images associated with Frames 1 and 2 of FIG. 5 once the image quality of that portion of the images that includes the hunter and the duck is modified relative to the remainder of the images based upon a change in the viewing behavior from Frame 1 to Frame 2 in accordance with an example embodiment of the present disclosure;

FIG. 19 illustrates a single object in Frame 1 splitting into multiple objects in Frame 2; and FIG. 20 illustrates multiple objects in Frame 1 merging into a single object in Frame 2.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A storyline guides the viewer and provides information to the viewer regarding different regions and/or different objects within the video that are intended for the viewer to see (e.g., these regions or objects may be considered to be of significance by the storyline creator). A storyline is typically defined by the creator of the content or by someone else involved in the creation and/or editing of the video and provides an indication of spatial regions within a video over time, which are recommended to the viewer. Thus, a storyline may include a first region and/or a first object in a first frame at a first time, a second region and/or a second object in a second frame at a second time and so on. The sequence of spatial locations generally includes those regions and/or objects of the video over time that are considered more interesting or more significant. For example, the creator of the content may define a storyline to encourage the viewer to consume those particular regions and/or objects of the video for any reasons (e.g., the regions and/or objects may be considered by the creator to be of most significance). As used herein a region and/or an object in a video may be referred to as an "region" and may be referred to as "regions" in the plural form.

Upon playing of the video, suggestions may be provided to the viewer of the different spatial regions over time that would be interesting for the viewer to watch. The suggestions may be provided to the viewer regarding the sequence of spatial regions that define the storyline in various manners. For example, the video may be automatically panned to each spatial region in sequence to ensure that the viewer watches the regions of the video included in the storyline. Alternatively, arrows or other directions may be displayed upon the video to provide an indication to the viewer as to the direction in which their attention should be relocated in order to view the next spatial region of the video in the storyline.

The creators of immersive multimedia content generally define a storyline via a manual process. Thus, the definition of a storyline may require additional effort and time on behalf of the creator of the content. Moreover, the storyline may be premised upon the subjective belief of the creator of the content as to those regions in the various frames of the video that are most significant and should be viewed, which may not always coincide with the regions of the different frames of the video that all or even a majority of the viewers believe to be of most significance. Further, once a storyline is created, it may be difficult to determine if a viewer actually follows the storyline or if the viewer, instead, views different regions of the video.

A method, apparatus and computer program product are therefore provided in accordance with an example embodiment in order to facilitate the definition of a storyline through the plurality of frames of a video, such as in an at least partially automated fashion and/or in a manner informed by viewers of the video. In this regard, the video includes a plurality of sequentially ordered frames. In some embodiments, the video provides immersive multimedia content, such as a plurality of sequential 360° images or omnidirectional images. 360° video or omnidirectional video may generally refer to video content that provides such a large field of view that only a part of the video is displayed at a single point of time by a typical display device. For example, omnidirectional video may be viewed on a head-mounted display (HMD) that may be capable of displaying, e.g., about a 100° field of view (FOV). The spatial subset of the virtual reality video content to be displayed may be selected based on the orientation of the head-mounted display. In another example, a flat-panel viewing environment is assumed, wherein, e.g., up to 40° field-of-view may be displayed. The use of the terms 360° video or omnidirectional video does not necessarily mean that the content covers the entire spherical field of view, but may for example cover a 360° horizontal field-of-view but less than a 180-degree vertical field-of-view.

The video may be presented by a virtual reality system, an augmented reality system or by other types of applications. The video may be presented in various manners. For example, the video may be presented upon a display screen, such as in a flat-panel viewing environment, or upon a visor or other display surface of a head-mounted display, such as provided by helmets, goggles, glasses or the like, having, for example, a visor upon which the video is presented. The video may be presented as a series of two-dimensional images or three-dimensional images depending upon, for example, the dimensionality of the video as well as the capabilities of the video presentation system, image processing system or the like that serve to process and present the video. If the video is three-dimensional, the three dimensional content may be represented, in one example embodiment in two dimensions in any one of various formats, such as equirectangular format, cubic format, panorama format, etc.

By following a storyline through the frames of the video, the viewer may be guided through the video in such a manner as to view those portions of the video that are considered, such as by the creator of the content or by someone else involved in the creation and/or editing of the video, to be of most significance. A storyline is defined to include different sequential regions of the video over time. In other words, the storyline is defined by a series of different regions of the video with the different regions occurring at different points in time throughout the video and being located at either the same spatial position or, more typically, different spatial positions throughout the video. In one example, the storyline may include a first region of a first frame of the video that is considered to be significant or of importance or of interest to the viewers of the storyline. Thereafter, at different sequential points in time during the playback of the video, the storyline includes a second region, a third region, a fourth region and a fifth region within second, third, fourth and fifth frames, respectively, of the video with the various regions of the frames of the video being of significance or of importance at the different, subsequent points in time. Thus, to follow the storyline, a viewer would initially view the first region of the first frame of the video and then sequentially transfer their view to the second region, the third region, the fourth region and the fifth region of the second, third, fourth and fifth frames, respectively, during the playback of the video. Each region is a portion of a frame of a video. Although regions may have different sizes and/or include different percentages of a respective frame, a region generally includes only some, but not all of a respective frame. In one embodiment, a region of a frame may have a size so as to be no more and, in some instances, less than that portion of a frame that can be presented upon a display at one time.

In order to guide the construction of a storyline in accordance with an example embodiment, the viewing behavior of one or more viewers may be collected and analyzed. In this regard, the viewing behavior of first and second viewers is described below in conjunction with FIG. 1. As shown in FIG. 1 and, in particular, by the frame of the video sequentially presented at time $t_1$, six different objects in different regions of the frame of the video, namely, a man in region A, a tree in region B, a bicycle in region C, a woman in region D, a park in region E and a wavy body of water in region F are depicted at different relative locations. As illustrated by the curved nature of the frame at time $t_1$, the video of this example embodiment is an image that extends at least 180° and, in some instances, 360° about the viewer. Although not illustrated, the video may, instead, present a series of 2D images. Subsequent frames of the video are depicted at times $t_2$, $t_3$, $t_4$ and $t_5$ as also shown in FIG. 1. In this example embodiment, the frames of FIG. 1 are arranged in sequential order beginning with the frame at time $t_1$ and concluding with the frame at time is such that $t_5 > t_4 > t_3 > t_2 > t_1$. The same or different lengths of time may elapse between each pair of adjacent frames shown in FIG. 1 and, in some embodiments, additional frames (not shown) may be positioned between any pair of frames (i.e., the frame at time $t_n$ and the frame at time $t_{n+1}$), before the frame at time $t_1$, and/or after the frame at time $t_5$. Although the regions and objects may remain static from frame to frame, the embodiment depicted in FIG. 1 illustrates the relative movement of the different objects with respect to one another from frame to frame.

The dashed directional arrows represent one set of objects in respective regions that are of interest to a viewer or a group of viewers, which may be referred to as a first viewer. As illustrated by the dashed directional arrow, a first viewer, for example, focuses upon different objects in respective regions in at least some of the frames. In this regard, the first viewer focuses upon the man in region A in the frame at time $t_1$, upon the tree in region B in the frame at time $t_2$, upon the park in region E in the frame at $t_3$, upon the body of water in region F in the frame at $t_4$ and upon the combination of the man, the body of water and the woman in combined region AFD in the frame at time $t_5$. The solid directional arrows represent another set of objects in respective regions that are of interest to another viewer or another group of viewers, which may be referred to as a second viewer. By way of another example and as indicated by the solid directional arrow, a second viewer, for example, either a different viewer than the first viewer or the same viewer who views the video for a second time, focuses their attention upon the woman in region D in at least some of the five frames. In this regard, the second viewer focuses upon the woman in the same region D in at least some of the five frames even though the woman moves relative to the other objects.

By tracking the viewing behavior of the first and second viewers, first and second storylines may be created. In this regard, a first storyline may be generated based upon the viewing behavior of the first viewer and a second storyline may be generated based upon the viewing behavior of the second viewer. In this regard and with reference to the alphabetical designation associated with the regions having the different objects in the video, the first storyline focuses upon objects in regions A-B-E-F-F in the frames for times $t_1$-$t_5$, respectively, while the second storyline focuses upon the object in region D, that is, the woman, in each of the five frames.

The viewing behavior of one or more prior viewers may be maintained in various manners including, for example, as a heat map. Heat maps provide information for images, such as for different frames of a video, indicating those regions of an image that are viewed and, in some instances, the number or percentage of viewers who view a respective region. As such, a heat map provides a visual representation of those regions of an image that are consumed in comparison to other regions of the same image that are not consumed or consumed to a much lesser degree. A heat map may be constructed for each of a plurality of frames of a video, such as the five different frames of FIG. 1, to identify one or more regions of a frame that have been viewed. Although the heat map may be shown integrated with the image presented by the respective frame, the heat map of one embodiment is separate from the image and may be overlaid upon the image of the respective frames in order to provide the information regarding the number of views in context. The regions of the frame may be identified in various manners including, for example, a visual demarcation, such as shown in FIG. 2. The number of viewers who viewed each respective region identified within the respective frame may be identified and stored. In an embodiment in which the regions of the frame that have been viewed are indicated by visual demarcations, different types of cross-hatching may be associated therewith indicating the number of views of the respective region. In other embodiments, different colors or different shades of gray may be associated with the various regions of the frame to indicate the number of views of the respective region. In some embodiments, information about or characteristics of the viewers may also be collected, such as the genders, ages and/or preferences of the viewers, and/or other information the viewers may voluntarily provide, such as their educational levels, economic statuses, etc. A heat map may be generated based on the viewer information or with the viewer information.

By way of example, FIG. 3 illustrates three frames, any three frames, of a video designated frame 1, frame 2 and frame 3. For each frame, a heat map of the respective frame is depicted. Following clustering of the regions of the respective frames that have been viewed as described below, visual representations, e.g., circles, ellipses, etc., of the regions that have been viewed as well as indications of the number of views are also depicted in FIG. 3 in relation to each of the frames. In this regard, frame 1 includes a single region designated as that has been the subject of 250 views. Frame 2 includes five different regions designated b, c, d, e and f that have been the subject of different numbers of views ranging from 10 views to 100 views. Overall, the regions of frame 2 have been the subject of 240 views, such that 10 viewers of frame 1 failed to continue to view frame 2 as indicated by the change from 250 total views of frame 1 to 240 total views of frame 2. Further, frame 3 includes two regions designated g and h that have been the subject of 120 views and 100 views, respectively for a total of 220 views. Thus, twenty additional viewers that viewed frame 2 failed to view frame 3 as represented by the decrease in total views from 240 with respect to frame 2 to 220 with respective to frame 3. Thus, although the viewing behavior of one or more viewers may be maintained in various manners, heat maps provide a visual representation of viewing behavior.

Instead of or in addition to determining the viewing behavior of one or more viewers, the manner in which the viewing behavior of a viewer changes from one frame to a successive frame may be determined and then utilized in various manners. In this regard, information may be collected regarding a plurality of objects in one or more of a plurality of frames of a video, the number of viewers focusing upon the respective objects in the different frames and the number of viewers who change from viewing one object in one frame to a different object in a successive frame. This information may be provided in various manners including as an identification of the plurality of objects and an indication as to the net increase or decrease in the number of views from the first frame to the second frame and/or an indication of the total number of views in the first frame and in the second frame from which the change in views may be identified. By way of example, FIG. 4 illustrates three objects designated the First Object, the Second Object and the Third Object, that appear in each of a plurality of frames of a video. With respect to the example of FIG. 4, information is provided that indicates that, for example, five viewers of the first object in a first frame switched to view the second object in the second frame while ten viewers of the second object in the first frame switched to view the third object in the second frame. Although the change in the number of viewers of the objects in different frames may be provided in different manners, FIG. 4 depicts the change in the number of views from the first image to the second image by the numbers associated with the arrows extending between the different objects. In addition, the total number of views of the different objects in the second image is also provided, such as ten views of the first object, five views of the second object and twenty views of the third object in the second frame following the change in the number of views represented by the arrows extending between the different objects.

By way of example of the information underlying the representation of the change in views of the first, second and third objects depicted in FIG. 4, there may have been fifteen views of the first object, ten views of the second object and ten views of the third object during one frame presented at $T_1$. In this same example, there may have been ten views of the first object, five views of the second object and twenty views of the third object in the frame presented at time $T_2$. In addition, the information collected regarding the viewing behavior of the plurality of prior viewers may identify that five viewers of the first object in the frame presented at time $T_1$ switched so as to view the second object in the frame presented at time $T_2$ as represented by the +5 associated with the arrow extending from the first object to the second object in FIG. 4. Similarly, ten viewers of the second object in the frame presented at the time $T_1$ switched so as to view the third object in the frame presented at time $T_2$ as represented by the arrow from the second object to the third object having the numerical designation of +10. Based upon the change in views of different objects from frame to frame within a video, additional information may be provided regarding the viewing habits and the manner in which the content of the video is consumed, thereby further facilitating the generation of the content including, for example, product placement within the video. In some embodiments, information about or characteristics of the viewers may also be collected, such as the genders, ages and/or preferences of the viewers, and/or other information the viewers may voluntarily provide, such as their educational levels, economic statuses, etc. Tracking of object viewing may be generated based on the viewer information or with the viewer information.

A more specific example of the information underlying the representation of the change in views of first, second and third objects is provided with respect to FIG. 5. As shown in Frame 1, ten viewers focused on the hunter, five viewers focused on the pig and fifteen viewers focused on the duck, while in a subsequent frame designated Frame 2, three viewers focused on the hunter, eight viewers focused on the pig and nineteen viewers focused on the duck. The number of viewers of each of the hunter, pig and duck may be summarized in Table 1 as follows:

TABLE 1

| Frame 1 | Frame 2 | | | |
|---|---|---|---|---|
| | Hunter | Pig | Duck | |
| Hunter | 3 | 2 | 5 | 10 |
| Pig | 0 | 5 | 0 | 5 |
| Duck | 0 | 1 | 14 | 15 |
| | 3 | 8 | 19 | |

The change in views of the hunter, pig and duck is then summarized in the frame into which Frames 1 and 2 flow in FIG. 5, which indicates that two viewers switched from the hunter in Frame 1 to the pig in Frame 2, five viewers switched from the hunter in Frame 1 to the duck in Frame 2, and one viewer switched from the duck in Frame 1 to the pig in Frame 2.

Various different actions may be taken based upon the changes in viewing behavior. For example, a storyline may be defined, such as described below, based at least partially upon the changes in viewing behavior between the first and second frames of the video. For example, the storyline may focus upon a first object in the first frame and a second object in the second frame based at least partially upon the changes in viewing behavior from the first object in the first frame to the second object in the second frame. As shown in FIG. 6, for example, the first object upon which the storyline focuses in the first frame may be the object that the most viewers are viewing, that is, the first object for which there are 15 views in the first frame as compared to 10 views of each of the second and third objects in the first frame. In this example, the second object upon which the storyline focuses in the second frame may be the object in the second frame to which the largest number of views migrated, such as evidenced by the transition of 10 views from the second object in the first frame to the third object in the second frame. As this example illustrates, the second object may be different than the first object in some embodiments, while, in other embodiments, the second object is the same as the first object. Thus, the storyline may be defined in accordance with this example to transition from focusing upon the first object in the first frame, such as by centering the first frame upon the first object, to focusing upon the third object in the second frame, such as by centering the second frame upon the third object, as shown in FIG. 6. Instead of centering the respective frames upon the object of interest, the frames may be repositioned such that the respective object is located at some other predefined notable location. Alternatively, a transition from the first frame to the second frame may be identified by a user, such as by selecting one of the directional arrows as shown in FIG. 4 that illustrates a change in views between a first object in the first frame and a second object in the second frame. In this example embodiment, the storyline may be defined so as to include the first object from the first frame, such as by including a first image that includes a portion of the first frame centered about the first object, and the second object from the second frame, such as by including a second image that includes a portion of the second frame centered about the second object.

Additionally or alternatively, the image quality of at least the second frame may be modified based at least partially upon the changes in viewing behavior between the first and second frames of the video. In this regard, the image quality of the first and second objects may be modified based at least partially upon the changes in viewing behavior from the first object in the first frame to the second object in the second frame. In this regard, the transition from the first frame to the second frame that is of most importance or otherwise of most interest may be identified by a user, such as by selecting one of the directional arrows as shown in FIG. 4 that illustrates a change in views between objects in the first frame and the second frame. Alternatively, the information that is provided regarding the largest change in viewing behavior between the first and second frames, such as from a first object in the first frame to a second object in the second frame, may define the transition that is to be highlighted by the modification of image quality.

In this example embodiment, the image quality of the second frame may be modified, such as by increasing the density or number of pixels representing the first object and the second object that experience the largest migration of views from the first object to the second object and/or by decreasing the density or number of pixels representing other portions of the image (such as portions of the image other than the first and second objects). Optionally, the image quality of that portion 60 of the image between and/or about the first and second objects may also be modified as shown in FIG. 7. Thus, the portion of the image that experiences the largest change in viewing behavior, such as the result of a transition of the largest number of views from the first object in the first frame to the second object in the second frame, may be displayed with increased quality to further improve the user experience, which likely will be focused upon the first and second objects. By limiting the modification in image quality to only a portion of the image, image processing resources are conserved by avoiding consumption of the image processing resources otherwise required to modify the image quality of the remainder of the image. As such, a difference in image quality, such as pixel resolution, is defined between that portion of the image including first and second objects for which the image quality has been modified, such as by being increased, relative to the remainder of the frame which may, for example, have a lower image quality.

Once information regarding viewing behavior of prior viewers has been collected, the method, apparatus and computer program product of an example embodiment are configured to define a storyline or to facilitate the definition of a storyline by a content creator, director or the like which, in turn, will guide future viewers of the same video. By way of example of the resulting storyline and with reference to FIG. 8, the frames of the video of FIG. 1 may be repositioned, such as by being shifted and/or rotated relative to the viewer, in order to facilitate subsequent viewing by a future viewer of the storyline that has been created based upon the portion of the video which the content creator, the producer or the like desired to be the focus and/or the viewing behavior of a prior viewer. In this regard, during subsequent presentation of the video, the different frames may be positioned relative to the viewer such that the object upon which a prior viewer focused during the generation of the storyline is centered and therefore more easily visible to a future viewer of the video. As used herein, an object or region of a frame being "centered" refers to the object or region, or any part thereof, being in a position within the field of view of a future viewer, including a position that is somewhat centered or exactly centered within the field of view. As shown in the frame presented at $t_1$ in FIG. 8, the video has been repositioned such that the man in region A is centered for the future viewer, while at time $t_2$, the video is repositioned such that the tree in region B is centered with respect to the future viewer. The frames of the video presented at different times, such as at times $t_3$, $t_4$ and $t_5$, may also be repositioned as shown in FIG. 8 such that the object that was the subject of focus by the prior viewer in conjunction with the generation of the storyline is centered relative to the future viewer. In some embodiments, one or more frames before and/or after any frames at times $t_1$-$t_5$ may also be repositioned (not shown) to provide a smooth viewing experience to a future view. As such, the future viewer can more readily view the storyline defined for the video in order to have an increased likelihood of viewing the important or interesting events captured by the video. While the video is repositioned in the example embodiment depicted in FIG. 8, the viewer may alternatively or additionally be repositioned or directed to reposition themselves to facilitate subsequent viewing of the storyline that has been created based upon the viewing behavior of a prior viewer.

A storyline can be generated on demand, e.g., on the fly, when a video of that storyline is being requested and/or viewed. A storyline can also be generated and stored before it is requested or viewed. One or more frames of the video may be omitted from a storyline, e.g., not included in the storyline. For example, one or more frames before the frame at $t_1$ and/or after the frame at $t_5$ may be omitted. Some frames between $t_1$ and $t_5$ may also or alternatively be omitted. Thus, a storyline may include any number or percentage of the frames of a video.

As illustrated by FIG. 8, the definition of a storyline may result in the frames of the video being repositioned when the video is viewed by a future viewer such that the objects that are the subject of focus in the different frames are centered for the future viewer, thereby reducing the need for the future viewer to move their head from side-to-side and/or up and down in an effort to see the more interesting portions of the video. In this regard, if the objects that are the subject of focus in the different frames were not centered as shown in FIG. 8, the transition for a future viewer from the tree in region B of the frame at time $t_2$ to the park in region E of the frame at time $t_4$ would require the future viewer to turn their head by a significant amount as evidenced by the distance there between in FIG. 1, thereby requiring significantly more effort to follow the storyline and correspondingly decreasing the likelihood that the storyline will be followed. As noted above, however, the objects that are the subject of focus in the different frames need not necessarily be centered during a replay of the video for a future viewer, but may, instead, be differently positioned if so desired.

While FIG. 8 depicts the presentation of a video for a future viewer in accordance with a single storyline that has been generated based upon the viewing behavior of one or more prior viewers, a plurality of storylines may be generated for the same video, such as based upon the viewing behavior of different prior viewers. By way of example, characteristics of the prior viewers may be collected, such as from profiles maintained for the prior viewers, along with information regarding their viewing behavior. Various characteristics may be collected including age, gender, interests, socio-economic status, education level, etc. or any combination thereof. The viewing behavior of one or more prior viewers having similar characteristics may then be accumulated and a corresponding storyline may be defined. Consequently, different storylines may be generated for the same video based upon the viewing behavior of different groups of prior viewers having different characteristics, such as a first storyline for younger viewers and a second storyline for older viewers. Thereafter, by analyzing corresponding characteristics of a future viewer, such as provided by a profile associated with the future viewer, the video may be displayed in accordance with the storyline that has been generated based upon the viewing behavior of a group of prior viewers having the same or similar characteristics as the future viewer. Additionally or alternatively, a future viewer may select the desired storyline from among a plurality of candidate storylines. In this regard, a representation, e.g., a snapshot, or other information regarding each of the candidate storylines may be presented and the future viewer may select the desired storyline based thereupon.

While FIG. 8 depicts the relative rotation of the video at each of a plurality of different times, the actual images, such as two-dimensional images, presented to a future viewer at each of the different times and centered upon the object that was the subject of focus in the respective frame during the generation of the storyline are depicted in FIG. 9. As shown by the image presented at time $t_1$, the portion of the frame that is within the viewing range of the viewer (as represented by the diverging dashed lines in FIG. 8) and that is centered upon the object upon which the prior viewer focused during the creation of the storyline is presented to a future viewer. Similarly, the images presented at the subsequent times $t_2$, $t_3$, $t_4$ and $t_5$ also correspond to those portions of the respective frames of the video that are within the viewing range of the viewer and that are centered upon the object upon which the prior viewer focused during the creation of the storyline. By way of further example of a different storyline generated for the same video, FIG. 10 presents the images presented to a future viewer in accordance with the different storyline created, for example, by the content creator, producer or the like based upon the portions of the video that they desired to be the focus and/or based upon the viewing behavior of the second viewer in FIG. 1 in which the second viewer focuses upon the woman in region D in each of the different frames. Since different storylines focus upon different objects in at least some of the frames of the video, the different storylines may cause different cues to be provided, such as by centering the frame about different objects or providing different instructions, e.g., directional arrows, to a future viewer to direct their gaze. Regardless of the storyline that has been constructed for a video, a future viewer may view any region of any frame of the video, whether the region that is viewed is part of the storyline or not, such as by turning their head and re-directing their gaze so as to view the desired region.

FIGS. 8-10 provide examples of the generation of a storyline based upon the viewing behavior of a prior viewer as exemplified by FIG. 1. However, a storyline may be generated based upon different or additional types of information. For example, the information relating to viewing behavior collected in conjunction with a heat map, such as shown in FIGS. 2 and 3 may be utilized to define a storyline, such as a storyline that includes those regions or objects within the different frames of a video that were most viewed by prior viewers based upon the information associated with a heat map. By way of another example, the information relating to changes in viewing behavior from one frame of a video to another, as described above in conjunction with FIGS. 4 and 5 may be utilized to define a storyline, such as a storyline that includes those regions or objects to which the largest number of prior viewers transferred their attention in proceeding from one frame of a video to a subsequent frame of the video.

As the foregoing description illustrates, three different types of people may be involved in the creation and consumption of the storyline. A first type is comprised of the initial viewers of the video whose viewing behavior is monitored and then utilized in order to construct a storyline. This first type is generally referenced as a prior viewer. A second type is comprised of the person who actually creates the storyline, such as based upon data gathered from the viewing behavior of the first type of viewers. Although a storyline may be created by various different people, the second type of person may be comprised of the content creator, producer and/or editor who defines the storyline. Thereafter, a third type of person views the video and utilizes the storyline. The third type is generally referenced as a future viewer. As such, the third type of person may be guided to the more interesting portions of the video, at least those portions that were most interesting to and attracted the focus of the first type of viewer and that were then relied upon during creation of the storyline.

The apparatus for defining a storyline may be embodied by a variety of different computing devices. For example, the apparatus may be embodied by a virtual reality system or an augmented reality system that is configured to provide immersive multimedia content for consumption by viewers. Regardless of the application, the apparatus may be embodied by a video presentation system, an image processing system or the like, such as may be carried by or associated with a helmet mounted display or as may be configured to drive other types of display devices upon which the video is presented. Alternatively, the apparatus may be embodied by a server or other computing device, configured to define the storyline and otherwise perform the functions described herein. In this embodiment, the apparatus may provide the resulting storyline and other information associated therewith to an image processing system of a virtual reality system or another application for use in conjunction with subsequent display of the video. Regardless of the type of computing device that embodies the apparatus, the apparatus 10 of an example embodiment depicted in FIG. 11 includes, is associated with or otherwise is in communication with a processor 12 and an associated memory 14, and optionally a display device 16 and/or a viewing direction tracking system 18.

The processor 12 (and/or co-processors or any other circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an image processing system) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 10 may include or otherwise be in communication with a display device 16 that may, in turn, be in communication with the processor 12 to cause presentation of the video content of the scene. As such, the display device may include, for example, a display, a touch screen, or other visual output mechanism. For example, the display device may be a helmet mounted display, a flat panel display or the like. Alternatively or additionally, the processor may comprise user interface circuitry configured to control at least some functions of the display device such as, for example, a display, and/or the like. The processor and/or user interface circuitry comprising the processor may be configured to control one or more functions of the display device through computer program instructions (e.g., software and/or firmware) stored on a memory accessible to the processor (e.g., memory device 14, and/or the like).

The apparatus 10 of an example embodiment may also include or otherwise be in communication with a viewing direction tracking system 18 in order to track the viewing direction of the viewer and, in turn, the point of regard within the field of view of the video that is the object of the viewer's attention. The viewing direction tracking system may be configured in various manners, but, in one embodiment, includes a gaze tracking system having one or more sensors to receive or collect information regarding the point of regard of the viewer and to convey the information to the processor 12 for determination of the location within the field of view that the viewer intends to view. The sensor may be one or more image sensors, e.g., cameras, for capturing respective images of one or more of a first eye of the viewer, a second eye of the same viewer and/or the field of view of the viewer. The sensor(s) in collaboration with the processor are configured to track eye movement and to estimate a point of regard of the viewer. Although a gaze tracking system may be embodied in various different manners, one example of a gaze tracking system is provided by U.S. patent application Ser. No. 14/918,962 entitled "Method, Apparatus, and Computer Program Product for Tracking Eye Gaze and Eye Movement" filed Oct. 21, 2015, the entire contents of which are incorporated herein in their entirety. Alternatively, the orientation of the viewer's head may be tracked based upon measurements provided by one or more accelerometers and/or gyroscopes and then interpreted by the processor as an estimate of the viewing direction.

The operations performed, such as by the apparatus 10 of FIG. 11, in accordance with an example embodiment in order to define a storyline throughout a video will now be described by way of example, but not of limitation, with respect to the flowchart of FIG. 12. As shown in block 20 of FIG. 12, the apparatus 10 includes means, such as the processor 12 or the like, for identifying, for each of a plurality of frames of a video, regions of a respective frame that had been viewed. Thus, for each or at least a plurality of the frames of the video, the apparatus, such as the processor, identifies those regions that have been viewed. The regions that have been viewed are generally those portions of the video that have been presented upon the display and/or those portions of the video, such as portions of a predefined size and shape, about respective locations that are the subject of focus by a viewer when viewing the frames of the video. The regions that have been viewed may be identified in various manners. In an embodiment in which a viewer views the video wearing a helmet mounted display, the position of the viewer's head, such as the pitch, roll and yaw values associated with the position of the viewer's head, may be determined by the viewing direction tracking system 18. The apparatus, such as the processor, may be configured to correlate the position of the viewer's head with a respective region of the frame of the video that is being presented and, as a result, identify the region of the respective frame that is being viewed. Alternatively, the position of the viewer's eyes may be tracked, such as with a camera or other sensor of the viewing direction tracking system, and the apparatus, such as the processor, may correlate the position of the viewer's eyes with a respective region of the frame of the video that is being presented and, as a result, identify the region of the respective frame that is being viewed. In yet another example embodiment in which user input is provided in order to identify the region of a frame that is to be presented upon a display and to be viewed by the viewer, the user input, such as may be provided by a mouse, a keyboard, a touch screen or the like, may be monitored and may be correlated by the apparatus, such as the processor, with a corresponding region of the frame that is currently being viewed in order to identify the respective region of the frame that is being viewed.

Regardless of the manner in which the region of a respective frame that has been viewed is identified, the apparatus 10, such as the processor 12, may construct a heat map of each of the plurality of frames, one example of which is shown in FIG. 2. In an example embodiment, the apparatus includes means, such as the processor or the like, for identifying regions of a respective frame that have been viewed by prior viewers by clustering one or more regions of the respective frame that had been viewed into a single region. The apparatus, such as the processor, may be configured to cluster a plurality of regions that are relatively closely positioned to one another into a single region in a variety of different manners. For example, the apparatus, such as the processor, may employ a clustering algorithm, such as a k-means clustering algorithm, in order to cluster two or more regions into a single region. In instances in which a k-means clustering algorithm is employed, k may be set to a relatively small number, such as 5. By clustering two or more regions that are closely located relative to one another within a respective frame into a single region, subsequent analysis of the region(s) of the frame that have been viewed may be performed in a more timely and computationally efficient manner.

In relation to identifying regions of a respective frame, the apparatus 10 of an example embodiment may additionally or alternatively include means, such as the processor 12 or the like, for eliminating one or more regions of a respective frame that have experienced no more than a predefined number of views from further consideration in relation to regions of a frame that have been viewed. Thus, the predefined number of views may be established, such as by the viewer, by a system designer or the like, to identify a lower threshold such that any region of a respective frame viewed by no more than the predefining number of views can be eliminated as a region for the respective frame and no longer considered during the subsequent analysis of the video and the definition of the storyline. By eliminating one or more regions of a respective frame that have experienced no more than a predefined number of views, the apparatus of this example embodiment may determine the storyline in a more timely and computationally efficient manner.

The video is generally comprised of a relatively large number of sequential frames. Oftentimes the image represented by a respective frame does not vary significantly from one frame to the next. Similarly, the region of the frame that is viewed by a viewer generally does not change appreciably from one frame to the next, at least not in instances in which the images represented by the frames do not vary significantly. In order to further improve the computational efficiency with which a storyline is defined, the apparatus 10 of an example embodiment optionally includes means, such as the processor 12 or the like, for representing two or more consecutive frames by a single frame in an instance in which the two or more consecutive frames each include regions that have been viewed and that satisfy a similarity threshold. See block 22 of FIG. 12. Various types of similarity thresholds may be defined. For example, the similarity threshold may be defined such that each region of the two or more consecutive frames has a size and shape that varies by no more than a predefined amount, such as a predefined percentage relative to the size of corresponding regions in the other frames of the two or more consecutive frames. Thus, in instances in which two more consecutive frames have the same number of regions and the regions are located in the same position and are of similar size and shape, the two or more consecutive frames may be represented by a single frame having the one or more regions that have been viewed.

As such, the two or more consecutive frames are represented, in this instance, by the single frame, thereby further reducing the processing subsequently performed in conjunction with the definition of a storyline. In instances in which two or more consecutive frames are combined into or represented by a single frame, the apparatus, such as the processor, maintains a record, such as in memory 14, of the two or more frames that are represented by a single frame.

Referring now to block 24 of FIG. 12, the apparatus 10 of this example embodiment includes means, such as the processor 12 or the like, for separately determining, for each first-frame region of one or more regions of a first frame of the plurality of frames, a transition probability. The transition probability defines the probability, such as in terms of a percentage or a value, of transitioning from the respective first-frame region of a first frame to a respective second-frame region of a plurality of regions of a second frame of the plurality of frames. The second frame is subsequent to the first frame and, in some embodiments, is the frame that immediately follows the first frame. For a region of the first frame, multiple transition probabilities may be defined with each transition probability defining the probability of transitioning from the same respective region of the first frame to a different respective region of the second frame. See, for example, FIG. 3 described above which illustrates the number of views for each of a plurality of regions in each of three different frames from which the change in viewers from one frame to another frame may be determined.

In relation to the determination of the transitional probabilities, a storyline graph G may be constructed that includes nodes representative of some of the regions of a plurality of frames. In this regard, each node represents a respective region of a respective frame, is located within the respective frame at the centroid of the respective region and is associated with a number of views associated with the respective region. The frames are disposed in temporal order and edges are defined between respective regions. In this regard, edges of a storyline graph are defined from each region of a preceding frame to each region of the immediately following frame. Thus, with respect to the transitional probabilities between the regions of frame 1 and frame 2, FIG. 13 depicts the storyline graph G in which five edges are defined with one edge extending from the single region a of frame 1 to each of the five regions of frame 2. Similarly, ten edges of the storyline graph G are defined between the five regions of frame 2 and the two regions of frame 3. In this regard and as shown in FIG. 13, two edges extend from each of the five regions of frame 2 with one edge from each region of frame 2 extending to each of the two regions of frame 3.

With respect to the transitional probabilities, the transition probability of an example embodiment defines the probability of transitioning along respective edges from a respective region of a first frame to each of a plurality of regions of a second frame of the plurality of frames. The transitional probability of transitioning along a respective edge may be defined in various manners. In one embodiment as shown in FIG. 13, however, the apparatus 10, such as the processor 12, is configured to define the transitional probability as the ratio of the number of viewers who were viewing the respective region of the first frame who then viewed a respective region of the next frame to the total number of views of the next successive frame. The transitional probability therefore represents the probability that a viewer would view the respective region of the next frame given that the viewer was viewing a respective region of the first frame. As the probabilities of transitioning to regions of the next region depend only on the regions of the first frame, the storyline graph G is a stochastic process that satisfies the Markov property, which allows solving for the most probable storylines efficiently using dynamic programming With respect to FIG. 13 which represents frames 1, 2 and 3 of FIG. 3 as well as the respective regions within those frames, for example, the transitional probability of the edge that extends from region a of frame 1 to region b of frame 2 is defined as 20/240 since there were 20 views of region b of frame 2 out of 240 total views of all of the various regions of frame 2.

The embodiment illustrated in FIG. 13 and described above is able to define the transitional probabilities in an instance in which the total number of views of frames 1 and 2 is the same or decreases from frame 1 to frame 2. In an instance in which the total number of views increases from frame 1 to frame 2 and in an instance in which each of the viewers that is considered for purposes of defining the transitional probabilities began to watch the video with its first frame, the transitional probabilities may be defined in the same manner with the denominator that is utilized in conjunction with the determination of the transitional probabilities being the total number of transitions from the previous frame to the current frame. In this example, when the number of views increases during the presentation of the video, the extra views are discarded and are not utilized in conjunction with the determination of the transitional probabilities.

Alternatively, in an instance in which the total number of views increases from one frame to the next with at least some viewers being new viewers who began watching the video after the video has already to be replayed, transition probabilities are defined based upon an assumption as to the region of a prior frame that would have been viewed by a new viewer if the new viewer had, in fact, watched the entire video. For example, in an instance in which there is a new view of a subsequent frame by a viewer who did not view a prior frame, a transition is created for the new viewer from one of a plurality of regions of the prior frame to the region of the subsequent frame that is actually viewed by the new viewer. With reference to FIG. 3, in an instance in which the total number of views in frame 3 increased to 244, with 120 views for region g and 124 views for region h, 24 of the views would be new. In an example embodiment, the transitions for these 24 new views of region h are defined proportionally to the transitions of actual views of the various regions of frame 2 to region h of frame 3. Hence, for the 24 new views, there would be 2 views from b->h, 2 views from c->h, 9 views from d->h, 10 views from e->h, and 1 view from f->h. This process can be repeated for each region in frame 3 that contains new views. Once all transitions have been determined for each new view of frame 3, the transition probabilities may be determined in the same manner as described above. In this example, b->h would have a probability of 7/22, and b->g would have a probability of 15/22.

As shown in block 26 of FIG. 12, the apparatus 10 further includes means, such as the processor 12 or the like, for separately determining, based on the transition probabilities, a path probability for each of a plurality of paths through the frames of the video. In this regard, each path is comprised of a region from a plurality, such as at least the first and second frames and, in one embodiment, each of the frames. A plurality of paths may be constructed with each path including one and only one region from each of a plurality of frames of a video. Each path that is constructed is different from the other paths and, in some embodiments, the plurality of paths that are constructed include every combination of the edges between the plurality of frames of the video.

As described, each path is comprised of a plurality of edges extending between respective frames of a video. As such, in order to determine a path probability for a respective path, the apparatus 10 of an example embodiment includes means, such as the processor 12 or the like, for determining a product of the transition probabilities associated with the plurality of edges that comprise the respective path. For example, in an instance in which a video is comprised of 100 frames identified to be processed and a path through the video includes 99 edges, one of which extends between each pair of adjacent frames identified to be processed, the resulting path probability would be the product of the transitional probabilities of each of the 99 edges. As such, the path probability defines the likelihood of a viewer following a respective path, such as by viewing the regions of the plurality of frames that comprise the respective path. By way of a more specific example, the storyline graph G of FIG. 13 is based upon the three frames of FIG. 3 and has ten possible paths, each comprised of a different combination of edges extending between frames 1 and 2 and between frames 2 and 3. These ten paths and their respective path probabilities based upon the transition probabilities of the edges that comprise the respective paths are as follows:

a-b-g: 20/240*15/20=1/16=0.0625
a-b-h: 20/240*5/20=1/48=0.0208
a-c-g: 20/240*10/20=1/24=0.0416
a-c-h: 20/240*10/20=1/24=0.0416
a-d-g: 90/240*70/80=21/64=0.3281
a-d-h: 90/240*10/80=3/64=0.0468
a-e-g: 100/240*25/90=25/216=0.1157
a-e-h: 100/240*65/90=65/216=0.3009
a-f-g: 10/240*0/10=0
a-f-h: 10/240*10/10=1/24=0.0416

In this example, larger values of path probability represent paths through the frames of a video that are more likely to be viewed by greater numbers of viewers than paths having smaller values for path probabilities. As shown above, the path designated a-d-g has the largest path probability value and, as a result, is most likely to be viewed by the largest number of viewers.

As shown in block 28 of FIG. 12, the apparatus 10 also includes means, such as the processor 12 or the like, for defining a storyline based on at least one of the path probabilities. The storyline may be defined in various manners. For example, the storyline may be defined to be the path having the largest path probability value. Alternatively, the storyline may be defined to be a path having a path probability that exceeds a predefined threshold, such as by being within a predefined percent of the largest path probability value while including regions of one or more frames that are considered to be of particular importance by, for example, the creator of the content even though the regions that are considered of importance were viewed by fewer viewers than other regions of the same frames.

In relation to defining a storyline, a storyline graph may be defined from frames $F=(f_1, f_n)$, in which $f_1 < \ldots < f_n$ defines the sequence of frames in which regions were identified. Additionally, the storyline graph of the frames F is a directed graph in which each node, such as a, b, c, . . . , is the centroid of a region of a respective frame and the edges connect the nodes representing the centroids of the regions of frame f to nodes representing the centroids of the regions of frame $f_{i+1}$. As such, the storyline as defined is a path in the storyline graph G that begins at a vertex representing the centroid of a region of frame $f_1$ and ends at a vertex representing the centroid of a region of $f_n$.

In relation to defining the storyline, the apparatus 10 of an example embodiment also includes means, such as the processor 12 or the like, for subjecting the storyline to one or more constraints. Although the storyline may be subjected to various constraints, the apparatus, such as the processor, of an example embodiment imposes a constraint upon the storyline that is defined to reduce the likelihood that the storyline includes a path that transitions between the respective regions of adjacent frames that are separated by at least a predefined amount. The predefined amount may be defined in various manners, such as a predefined distance, a predefined angle or the like. As such, this constraint serves to prevent storylines from being defined that include a dramatic transition from a region of one frame to a different region of the next successive frame in which the transition would involve the viewer changing their focal point by a substantial amount, such as from one edge of the image to the opposite edge of the image or from one corner of the image to the opposite corner of the image, since such transitions are unlikely to occur as a practical matter.

By defining a storyline as described above, the storyline may be defined in an automated or at least partially automated fashion, thereby increasing the efficiency with which a video and its corresponding storyline are created. Thereafter, viewers may view the video and be guided by the storyline to the different regions of the various frames of the video that comprise the storyline, such as by automatically panning the video to display the regions of the frames included in the storyline regardless of the viewing direction or by presenting arrows or other directional indicators to guide a viewer to the regions of the frames included in the storyline. As such, the user experience in relation to their consumption of the video may be enhanced.

Following the construction of a storyline, the method, apparatus 10 and computer program product of an example embodiment are configured to determine a score associated with a storyline of a video based upon the precision with which viewer(s) track the storyline when watching the video. The determination of the score associated with a storyline may be performed in conjunction with and subsequent to the definition of the storyline as described above and as shown in, for example, FIG. 12. Alternatively, the score for a storyline of a video may be determined separate from the definition of the storyline, such as in an instance in which the storyline was previously defined, either in accordance with the process depicted in FIG. 12 and described above or in accordance with a different process.

Regardless, the apparatus 10 of an example embodiment includes means, such as the processor 12 or the like, for determining the score associated with the storyline based upon the number of regions of the path through the frames of a video that comprise the storyline that are actually viewed. By way of example, a storyline may be defined as a sequence of $(r_i, f_i)$ pairs representing a respective region $r_i$ of a frame $f_i$ such that the storyline S is defined as $((r_1, (r_2, f_2), \ldots, (r_n, f_n))$ in which $f_1 < f_2 < \ldots < f_n$ in terms of their relative temporal positions for n frames. Thereafter, during replay of a video, a viewing session of a viewer may be defined as $V=((s_1, f_1), (s_2, f_2), \ldots, (s_n, f_n))$ where $s_1, \ldots s_n$ are the individual regions that are actually viewed at frames $f_1, \ldots f_n$, respectively. Thus, the resulting score may be defined as: Score=$(\Sigma_{i=1 \ldots n} F(r_i, s_i))/n$ wherein F(x, y) is a function that returns the value 1 if the region x of the frame that was included in the storyline was actually consumed by the viewer who was viewing region y, but otherwise returns a value of 0. Thus, the score defines the number of frames in which the viewer views the region that is included within the storyline divided by the total number of frames of the storyline. Thus, larger scores represent viewing sessions in which a viewer more closely follows the storyline, while lower scores represent viewing sessions in which a viewer deviates more greatly from the storyline.

Although described above in conjunction with a single viewing session, the apparatus 10, such as the processor 12, may be configured to determine the score associated with a storyline in response to multiple viewing sessions by multiple viewers and/or by multiple viewing sessions of a single viewer. In this embodiment, a value is defined for each frame in which the value is the ratio of the number of views of the respective frame in which the viewers viewed the region included within the storyline to the total number of views of the respective frame. The score is then defined as the sum of the values defined for each frame divided by the total number of frames of the video. By considering the resulting score, a determination as to whether viewers generally followed the storyline or did not follow the storyline may be made. In instances in which the creator of the content wishes for the viewers to follow the storyline, but the score indicates that the viewers do not, in fact, generally follow the storyline, the creator of the content may investigate the reasons for this deviation and may, in some instances, modify the video in order to encourage viewers to more closely follow the storyline.

As described above, heat maps provide information regarding the manner in which a frame is viewed. In this regard, a heat map, such as shown in FIG. 2, identifies the regions that are viewed and, in some embodiments, identifies the number of views associated with each region. Heat maps may be generated for a plurality of frames of a video, such as each frame of a video. Because of the large number of frames included in a number of videos, a substantial amount of information is collected in the form of heat maps relating to the manner in which the different frames of the video are viewed. However, the number of frames of the video and the amount of information that is collected relating to the manner in which the frames are viewed may introduce challenges in relation to the evaluation of the viewing habits represented by the plurality of heat maps. As such, the apparatus 10 of an example embodiment is configured to increase the efficiency and effectiveness with which a user interacts with the heat maps and obtains useful information regarding the viewing habits of the viewers consuming a video. The techniques described herein with respect to the facilitation of interaction with information relating to the viewing habits may be performed in combination with the techniques described above for defining a storyline. Alternatively, the techniques for facilitating interaction with the information gathered regarding the viewing habits may be performed separately and independently from any technique for defining a storyline and, indeed, may be performed in the absence of a storyline.

In one example, the apparatus 10 includes means, such as the processor 12, a user interface or the like, for receiving user input identifying one or more areas of a respective frame of a video that are of interest to the user. Although not shown in FIG. 11, the apparatus may include or be associated with various different types of user interfaces including, for example, a keyboard, a mouse, a joystick, a touch screen, touch areas, soft keys, a microphone or other input mechanisms. In response to the user input, the apparatus includes means, such as the processor, the display device 16 or the like, for presenting information regarding the number of views for the selected area, such as based upon information gleaned from a heat map of the respective frame. The user input may be received in various manners. For example, the user input may define an area of a frame of the video of a certain shape and size, such as a rectangle, a circle, a polygon or a free-form shape, and the apparatus, such as the processor, may then identify the number of views of the area circumscribed by the shape defined by the user input. Alternatively, the user input may select an object depicted in a frame of the video. The bounds of the object may be determined, such as by the processor, based upon a segmentation technique with views of the object then being identified and information relating thereto provided to the user. While various segmentation techniques may be utilized in order to identify the object and its bounds within a frame of the video, an example of a segmentation technique is provided by C. Rother, et al., "GrabCut: Interactive Foreground Extraction Using Iterated Graph Cuts", ACM Trans. Graph., vol. 23, pp. 309-314 (2004). In instances in which the user identifies an object such that the bounds of the object define the area of interest, the information subsequently presented regarding the views of the selected area provides information regarding the number of views of the object (or the percentages of views of the selected object to the total views of the frame) and, in instances in which the object is tracked from frame to frame, the information also informs as to the consistency with which viewers follow the object.

In another example embodiment in which a plurality of objects, such as objects selected by the user, are tracked from frame to frame in a video, the apparatus 10 is configured to determine the manner in which viewers either continue to view the same object from frame to frame or change their view from one object to another. In this example embodiment and as shown in block 40 of FIG. 14, the apparatus includes means, such as the processor 12 or the like, for identifying each of a plurality of objects that are included within a respective frame. This identification of the plurality of objects is performed for each of a plurality of frames of a video. The apparatus, such as the processor, may identify each of the plurality of objects in various manners including, for example, by tracking a plurality of objects that were initially selected based upon user input. The tracking of an object may be performed in various manners such as described by A. Yilmaz, et al., "Object Tracking: A Survey", ACM Comput. Surv., vol. 38, no. 4 (December 2006); Z. Kalal, et al., "Tracking-Learning-Detection", IEEE Transactions on Pattern Analysis and Machine Intelligence, vol. 34, no. 7, pp. 1409-1422 (July 2012); and D. Held, et al., "Learning to Track at 100 FPS with Deep Regression Networks", European Conference on Computer Vision (ECCV) (2016). In this example embodiment and as shown in block 42 of FIG. 14, the apparatus includes means, such as the processor or the like, for determining a first number of views by a plurality of viewers of each of the plurality of objects that are included within a first frame.

The apparatus 10 of this example embodiment also includes means, such as the processor 12 or the like, for determining, for a second frame subsequent to the first frame, a second number of views by the plurality of viewers of each of the plurality of objects that are included within the second frame and means, such as the processor or the like, for identifying the number of instances in which a respective viewer who viewed one of the plurality of objects within the first frame changed to view a different one of the plurality of objects within the second frame. See blocks 44 and 46 of FIG. 14. Thus, the apparatus, such as the processor, not only determines the number of views of each of the same plurality of objects that appears in each of the two frames, but also identifies the individual viewer who switched from viewing one object in the first frame to a different object in the second frame. In this example embodiment, the apparatus also includes means, such as the processor, the display device 16 or the like, for causing information to be provided regarding changes in viewing behavior in relation to the plurality of objects between the first and second frames of the video. See block 48 of FIG. 14.

As described above in conjunction with FIG. 4, this information may be provided in various manners including as an identification of the plurality of objects and an indication as to the net increase or decrease in the number of views from the first frame to the second frame and/or an indication of the total number of views in the first frame and in the second frame from which the change in views may be identified. As also described above, various different actions may be taken based upon the changes in viewing behavior. For example, the apparatus 10 of one embodiment includes means, such as the processor 12 or the like, for defining a storyline based at least partially upon the changes in viewing behavior between the first and second frames of the video. See block 50 of FIG. 14. For example, the apparatus, such as the processor, may define the storyline to focus upon one object in the first frame and another object in the second frame based at least partially upon the changes in viewing behavior from one object in the first frame to another object in the second frame. See, for example, FIG. 6. The objects in the first and second frames may be either the same or different objects. The storyline may focus upon the respective objects in various manners, such as by presenting the frame such that the object of interest is centered within the display and/or providing directions to the future viewer as to the direction in which to look in order to view the object of interest. Regardless of the manner in which the video is presented and the storyline is followed, the future viewer is still able to view any region of the video, regardless of whether the region that is viewed is included in the storyline or not.

The objects that are the subject of the storyline in first and second frames, for example, may be identified in various different manners. For example, the object that is included in the storyline for a respective frame may be the object that is viewed by the largest number of prior viewers, such as the first object in the first frame and the third object in the second frame as described above in conjunction with FIGS. 4 and 6. Or, the object that is included in the storyline for a respective frame may be the object to which the largest number of prior viewers transition relative to the prior frame, such as the third object to which ten new viewers transition in the embodiment of FIG. 4. As yet another example, a user, such as a future viewer, may select a transition from one object to another object, such as by selecting one of the directional arrows of the embodiment of FIG. 4 which identifies the number of prior viewers to switch from one object to another object. In this example, the storyline may then include the one object in a first frame and the another object in a second frame.

By way of example, reference is now made to FIG. 15 which depicts three frames that are captured at times $t_1$, $t_2$ and $t_3$ with $t_3 > t_2 > t_1$. Each frame includes three objects, namely, a hunter, a pig and a duck. The number of viewers of each object in the frames captured at times $t_1$ and $t_2$ and the transition of viewers from one object to another object from the frame captured at time $t_1$ to the frame captured at time $t_2$ are described above and summarized in FIG. 5. In response to the selection of the transition from the hunter in the frame captured at time $t_1$ to the duck in the frame captured at time $t_2$, such as by the user's selection of the directional arrow in FIG. 5 that extends from the hunter to the duck, the storyline depicted in FIG. 16 is constructed. In this regard, the storyline focuses upon the hunter in the frame captured at time $t_1$ and upon the duck in the frame captured at time $t_2$ as a result of the selection of the transition from the hunter to the duck in proceeding from the frame captured at time $t_1$ to the frame captured at time $t_2$. The storyline of this example then continues to focus upon the duck in subsequent frames, such as in the frame captured at time $t_3$.

As noted above, a plurality of storylines may be constructed for the same video. In the example of FIG. 15, focus upon the duck that is shot by the hunter may be of lesser interest for some future viewers, such as children. As such, a second storyline may be constructed as shown in FIG. 17 in which focus is upon the hunter and the pig, but not the duck that is shot by the hunter. Additional storylines may be constructed based upon the video for which three frames are shown in FIG. 15 in addition to or instead of the storylines shown in FIGS. 16 and 17. As shown in this example, the object that is the subject of focus in each frame in accordance with the storyline is highlighted by encircling the object with border. However, the object that is the subject of focus in each frame in accordance with the storyline may be identified or emphasized in other manners, such as by centering the portion of each frame that is displayed upon the object of interest.

In some embodiments, the frames for which the viewing behavior is studied in order to define the respective objects that will be the focus for corresponding images in the storyline comprise a plurality of key frames with the video including one or more intermediate frames between at least some of the key frames. Once the object of a frame that will serve as the focal point for the corresponding image in the storyline has been identified, the apparatus 10, such as the processor 12, is configured to reposition each of the intermediate frames for presentation in accordance with the storyline by interpolating between the point within a first key frame that is centered (or has some other predefined location) within the corresponding image in the storyline and the point within the next sequential key frame that is centered (or has some other predefined location) within the corresponding image in the storyline. Thus, the storyline constructed based upon the viewing behavior of some key frames may be completed by including a number of intermediate frames between the key frames with the repositioning of the intermediate frames being based upon an interpolation of the relative position of the immediately preceding key frame and the immediately following key frame.

Additionally or alternatively, the apparatus 10 may include means, such as the processor 12 or the like, for modifying the image quality of at least the second frame based at least partially upon the changes in viewing behavior between the first and second frames of the video. See also block 50 of FIG. 14. As described above and as shown in FIG. 7, the apparatus, such as the processor, may modify the image quality of the first and second objects based at least partially upon the changes in viewing behavior from the first object in the first frame to the second object in the second frame, such as based upon user input and/or information regarding changes in viewing behavior between frames.

By way of a more specific example that builds upon the frames of a video depicting a hunter, a pig and a duck that were described above and illustrated in FIG. 5, FIG. 18 illustrates Frames 1 and 2 after having modified the image quality of portions of the frames. In this regard, the transition from the hunter in Frame 1 to the duck in Frame 2 was identified as being the most popular with five viewers switching from viewing the hunter in Frame 1 to viewing the duck in Frame 2. As such, the image quality of the hunter and the duck may be modified in conjunction with the presentation of Frames 1 and 2 for a future viewer. As shown by the highlighted region 60 in FIG. 18, the image quality of not only the hunter and the duck is modified, but, in this example embodiment, that portion of the image that extends between and encompasses the hunter and the duck is also modified.

Although the foregoing examples generally describe each of the frames as having the same number of objects, the apparatus 10 of an example embodiment also includes means, such as the processor 12 or the like, for identifying each of the plurality of objects in such a manner that more objects are identified in the second frame than in the first frame. For example, one object in the first frame may have split into a plurality of objects in the second frame, thereby increasing the total number of objects in the second frame. By way of example, FIG. 19 illustrates a scenario in which a single bicycle in Frame 1 splits into two objects, namely, a front wheel and the remainder of the bicycle, in Frame 2 as a result of the front wheel becoming disconnected from the bicycle frame and rolling away. As such, the apparatus, such as the processor, of this embodiment is configured to identify the number of viewers of the bicycle in Frame 1 and to separately identify the number of viewers of the front wheel and the remainder of the bicycle in Frame 2. By way of example and as summarized below in Table 2, 22 viewers viewed the bicycle, 10 viewers viewed the person and 2 viewers viewed the building in Frame 1, while 7 viewers viewed the front wheel, 10 viewers viewed the remainder of the bicycle, 15 viewers viewed the person and 2 viewers viewed the building in Frame 2.

TABLE 2

| | Frame 2 | | | |
|---|---|---|---|---|
| Frame 1 | Remainder of the Bicycle | Front Wheel | Person | Building |
| Bicycle | 10 | 7 | 5 | 0 |
| Person | 0 | 0 | 10 | 0 |
| Building | 0 | 0 | 0 | 2 |

Thus, once the front wheel disconnects from the remainder of the bicycle in Frame 2, a number of the viewers of the bicycle in Frame 1 began viewing either the front wheel or the person in Frame 2.

Conversely, the apparatus 10 of an example embodiment may include means, such as the processor 12 or the like, for identifying each of the plurality of objects by identifying fewer objects in the second frame than in the first frame. For example, a plurality of objects in the first frame may have merged into a single object in the second frame, thereby reducing the number of objects in the second frame. By way of example, FIG. 20 illustrates a scenario in which a football is in the air heading towards a receiver (white jersey) and a defender (dark jersey) in Frame 1 and the football is then caught by the receiver in Frame 2, thereby causing the merging of the football and the receiver into a single combined object in Frame 2. As such, the apparatus, such as the processor, of this embodiment is configured to separately identify the number of viewers of the football and the receiver in Frame 1 and to identify the number of viewers of the combination of the football and the receiver in Frame 2. By way of example and as summarized below in Table 3, 20 viewers viewed the football, 5 viewers viewed the receiver and 1 viewer viewed the defender in Frame 1, while 25 viewers viewed the combination of the football and the receiver and 1 viewer viewed the defender in Frame 2.

TABLE 3

| Frame 1 | Frame 2 | |
| --- | --- | --- |
| | Receiver with ball | Defender |
| Ball | 20 | 0 |
| Receiver | 5 | 0 |
| Defender | 0 | 1 |

Thus, once the football is caught by the receiver in Frame 2, all of the viewers who separately viewed the football and the receiver in Frame 1 continued viewing the combination of the football and the receiver in Frame 2.

In this example embodiment, the information regarding changes in viewing behavior between the first and second frames of the video may define the changes in viewing behavior between all of the objects in the first and second frames including, for example, between a single object in the first frame and a plurality of objects in the second frame into which the single object split or between a plurality of objects in the first frame and a single object in the second frame into which the plurality of objects merged.

As described above, FIGS. 12 and 14 illustrate flowcharts of an apparatus 10, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by a processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 12 and 14. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:
1. An apparatus comprising:
at least one processor; and
at least one memory including computer program code, the at least one memory and computer program code configured to, with the at least one processor, cause the apparatus to:
identify, for a plurality of identified frames of a video comprising a first frame and at least one second frame subsequent to the first frame, a plurality of objects that are included within the first frame and a plurality of objects included in the second frame;
determine a first number of views by a plurality of viewers of each of at least one of the plurality of objects that are included within the first frame;

determine, for the at least one second frame, a second number of views by the plurality of viewers of each of at least one of the plurality of objects that are included within the second frame;

identify a number of instances in which a respective viewer who viewed one of the plurality of objects within the first frame changed to view a different one of the plurality of objects within the second frame; and cause information to be provided regarding changes in viewing behavior between the first and second frames of the video in relation to the plurality of objects included within the first and second frames.

2. An apparatus according to claim 1 wherein the at least one memory and computer program code are further configured to, with the at least one processor, cause the apparatus to define a storyline based at least partially upon the changes in viewing behavior between the first and second frame of the video.

3. An apparatus according to claim 2 wherein the at least one memory and computer program code are configured to, with the at least one processor, cause the apparatus to define the storyline by defining the storyline to focus upon a first object in the first frame and a second object in the second frame based at least partially upon the changes in viewing behavior from the first object in the first frame to the second object in the second frame.

4. An apparatus according to claim 1 wherein the at least one memory and computer program code are further configured to, with the at least one processor, cause the apparatus to modify image quality of at least the second frame based at least partially upon the changes in viewing behavior between the first and second frame of the video.

5. An apparatus according to claim 4 wherein the at least one memory and computer program code are configured to, with the at least one processor, cause the apparatus to modify the image quality by modifying the image quality of first and second objects based at least partially upon the changes in viewing behavior from the first object in the first frame to the second object in the second frame.

6. An apparatus according claim 1 wherein the at least one memory and computer program code are configured to, with the at least one processor, cause the apparatus to identify the plurality of objects by identifying more objects in the second frame than in the first frame.

7. An apparatus according to claim 6 wherein one object in the first frame splits into a plurality of objects in the second frame.

8. An apparatus according to claim 1 wherein the at least one memory and computer program code are configured to, with the at least one processor, cause the apparatus to identify the plurality of objects by identifying fewer objects in the second frame than in the first frame.

9. An apparatus according to claim 8 wherein a plurality of objects in the first frame merge into a single object in the second frame.

10. A method comprising:
for a plurality of identified frames of a video comprising a first frame and at least one second frame subsequent to the first frame, identifying a plurality of objects that are included within the first frame and a plurality of objects that are included in the second frame;
determining a first number of views by a plurality of viewers of each of at least one of the plurality of objects that are included within the first frame;
for the at least one second frame, determining a second number of views by the plurality of viewers of each of at least one of the plurality of objects that are included within the second frame;
identifying a number of instances in which a respective viewer who viewed one of the plurality of objects within the first frame changed to view a different one of the plurality of objects within the second frame; and
causing information to be provided regarding changes in viewing behavior between the first and second frame of the video in relation to the plurality of objects included within the first and second frame.

11. A method according to claim 10 further comprising defining a storyline based at least partially upon the changes in viewing behavior between the first and second frame of the video.

12. A method according to claim 11 wherein defining the storyline comprises defining the storyline to focus upon a first object in the first frame and a second object in the second frame based at least partially upon the changes in viewing behavior from the first object in the first frame to the second object in the second frame.

13. A method according to claim 10 further comprising modifying image quality of at least the second frame based at least partially upon the changes in viewing behavior between the first and second frame of the video.

14. A method according to claim 13 wherein modifying the image quality comprises modifying the image quality of first and second objects based at least partially upon the changes in viewing behavior from the first object in the first frame to the second object in the second frame.

15. A method according claim 10 wherein identifying the plurality of objects comprises identifying more objects in the second frame than in the first frame.

16. A method according to claim 10 wherein identifying the plurality of objects comprises identifying fewer objects in the second frame than in the first frame.

17. A computer program product comprising a non-transitory computer-readable storage medium having computer-readable program code stored therein, the computer-readable program code configured, upon execution, to:
identify, for a plurality of identified frames of a video comprising a first frame and at least one second frame subsequent to the first frame, a plurality of objects that are included within the first frame and a plurality of objects included in the second frame;
determine a first number of views by a plurality of viewers of each of at least one of the plurality of objects that are included within the first frame;
determine, for the at least one second frame, a second number of views by the plurality of viewers of each of at least one of the plurality of objects that are included within the second frame;
identify a number of instances in which a respective viewer who viewed one of the plurality of objects within the first frame changed to view a different one of the plurality of objects within the second frame; and
cause information to be provided regarding changes in viewing behavior between the first and second frames of the video in relation to the plurality of objects included within the first and second frames.

18. A computer program product according to claim 17 wherein the computer-readable program code is further configured to define a storyline based at least partially upon the changes in viewing behavior between the first and second frame of the video.

19. A computer program product according to claim 18 wherein the computer-readable program code is configured to define the storyline by defining the storyline to focus upon a first object in the first frame and a second object in the second frame based at least partially upon the changes in viewing behavior from the first object in the first frame to the second object in the second frame.

20. A computer program product according to claim 17 wherein the computer-readable program code is further configured to modify image quality of at least the second frame based at least partially upon the changes in viewing behavior between the first and second frame of the video.

\* \* \* \* \*